United States Patent
Backer et al.

(10) Patent No.: US 6,325,883 B1
(45) Date of Patent: Dec. 4, 2001

(54) METHOD AND APPARATUS FOR MAKING FIBER OPTIC COUPLERS

(76) Inventors: Marcella Rose Backer, 728 W. Broad St., Pine City, NY (US) 14871; Mark Alan McDermott, 728 W. Broad St., Horseheads, NY (US) 14845; William James Miller, 69 Davis St., Corning, NY (US) 14830; Mark Leon Morrell, 126 Burkshire Dr., Horseheads, NY (US) 14845

( * ) Notice: Subject to any disclaimer, the term of this patent is extended or adjusted under 35 U.S.C. 154(b) by 0 days.

(21) Appl. No.: 09/525,626

(22) Filed: Mar. 14, 2000

Related U.S. Application Data

(62) Division of application No. 09/043,758, filed as application No. PCT/US96/15254 on Sep. 16, 1996, now Pat. No. 6,092,394.
(60) Provisional application No. 60/004,647, filed on Sep. 29, 1995.

(51) Int. Cl.⁷ .................................................. G02B 6/255
(52) U.S. Cl. ................................. 156/275.5; 156/275.7; 156/294; 156/578; 65/409; 385/51
(58) Field of Search ............................ 156/275.5, 275.7, 156/294, 578, 423, 379.8; 65/409; 385/43, 51, 95, 96, 97, 98; 389/99

(56) References Cited

U.S. PATENT DOCUMENTS

| | | | |
|---|---|---|---|
| 4,391,391 | * | 7/1983 | Robaldo .............................. 222/478 |
| 4,902,324 | * | 2/1990 | Miller et al. .......................... 385/43 |
| 5,251,276 | * | 10/1993 | Berkey et al. ........................ 385/43 |

* cited by examiner

*Primary Examiner*—Steven D. Maki
*Assistant Examiner*—Todd J. Kilkenny

(57) ABSTRACT

A method is disclosed for applying glue to a fiber optic coupler composed of a plurality of contiguously extending optical fibers, the fibers extending though the bore of a tube and through a longitudinally adjacent coupling region where the tube is collapsed around the fibers, the fibers being fused together in the coupling region, the diameters of the fibers in the coupling region being smaller than the diameters thereof in the bore. The method comprises: holding the coupler, and simultaneously injecting glue into both ends of the tube bore; wherein the coupler is oriented vertically, the glue being injected into the bore ends by positioning a hollow needle at each of the bore ends, the glue flowing through the needle in the bore at the top end of the tube at a rate greater than it flows through the needle in the bore at the bottom end of the tube.

6 Claims, 29 Drawing Sheets

TOP VIEW

SIDE VIEW

METHOD AND APPARATUS FOR MAKING FIBER OPTIC COUPLERS

This is a division of application Ser. No. 09/043,758, filed Mar. 25, 1998, now U.S. Pat. No. 6,092,394, which was the National Stage of Application No. PCT/US96/15254, filed Sep. 16, 1996 and claims the benefit of U.S. Provisional Application No. 60/004,647, filed Sep. 29, 1995.

BACKGROUND OF THE INVENTION

The present invention relates to the automated manufacturing of fiber optic couplers.

Overclad fiber optic couplers are a type of fused fiber coupler wherein the coupling region is enclosed within a layer of matrix glass which strengthens and encloses the coupling region. To form an overclad fiber optic coupler, the stripped portions of a plurality.of fibers are inserted into the bore of a glass capillary tube to form a coupler preform. The tube bore has enlarged funnel-shaped end portions that facilitate the insertion of optical fibers. The midregion of the coupler preform is heated to collapse the tube onto the fibers; the coupler preform is then stretched until the desired coupling characteristics are obtained. Various types of overclad fiber optic couplers and methods of making such couplers are disclosed in U.S. Pat. No. Re 35,138, U.S. Pat. Nos. 4,902,324, 4,979,972, 5,011,251, 5,251,276 and 5,268,014. The methods disclosed in these patents include many manual operations.

In accordance with conventional practice, the manually operated fiber draw apparatus has been oriented such that the tube is vertically positioned. The fibers have been inserted into the tube either on-line or off-line. The off-line fiber insertion process (U.S. Pat. No. 4,902,324) requires that the fibers be tacked to the tube to prevent the fibers from moving with respect to the tube during the step of transferring the coupler preform to the coupler draw apparatus. The tacking glue can cause problems in the resultant coupler. Moreover, the off-line method requires additional steps to transfer the tube to the draw apparatus. The previously employed methods of inserting fibers into the tube either on-line or off-line have been tedious, time consuming processes that are sensitive to the manipulations of each operator. This can affect process reproducibility and thus the optical characteristics of the couplers.

Optical fibers must be prepared prior to inserting them into the tube. The protective coating is removed from the portion of the fiber that is to be positioned within the tube during the coupler drawing operation. If the bare portion of the optical fiber is at the end of the fiber, it is preferred that it be provided with a low reflectance termination. An off-line process for forming such a termination is disclosed in U.S. Pat. Nos. 4,979,972 and 5,011,251. Also, the bare fiber portions must be free from contamination. Manual performance of these fiber preparation steps is time consuming and is subject to the particular manipulations of the operator.

During the stripping of coating from the fibers, the termination of fibers, and the insertion of the stripped portions of fibers in the overclad tube, the fibers must be precisely positioned.

In the manual technique for making overclad fiber optic couplers, the fibers were threaded through the glass tube, the tube was clamped into the draw apparatus. Thereafter, the fiber pigtails extending from the glass tube were inserted through vacuum attachments which were then affixed to the ends of the tubes. Such vacuum attachments are unsuitable for an automated apparatus for manufacturing fiber optic couplers. A preferred heat source for forming overclad fiber optic couplers has been a ring burner that directs flames inwardly toward the glass tube. Heretofore, the glass tube has been manually inserted through the ring burner, and its ends were then clamped. Such a burner is not suitable for use in a fully automated apparatus.

In an automated fiber optic coupler manufacturing process, couplers can be made at a greater rate than they could be made by the aforementioned manual process. The heat source must be activated during the stretching of each coupler. This tends to cause the temperature of certain parts of the apparatus near the heat source to become hotter than they did in the manual process. Some of those apparatus parts and the coupler epoxy can be damaged by the higher temperature or can be dimensionally altered whereby process reproducibility is affected. Precautions must be taken to avoid such heat induced damage.

After the coupler has been formed by stretching the overclad tube and fibers, a glue such as an ultraviolet (UV) curable epoxy is inserted into the uncollapsed ends of the tube bore to provide the fibers with pull strength. Conventional off-line epoxy applying and curing techniques are not suitable for use in a fully automated coupler making process since they do not result in the application of a sufficient amount of epoxy into both ends of the bore, and since they are time consuming processes.

SUMMARY OF THE INVENTION

In view of the above mentioned disadvantages of conventional methods of manufacturing fiber optic couplers, it is an object of the present invention to provide an apparatus and method of precisely and automatically manufacturing a fiber optic coupler having predetermined coupling characteristics. Another object is to provide a coupler manufacturing apparatus and method in which opportunities for operator caused process inconsistencies are minimized or eliminated.

The present invention-relates to various apparatus components and method steps for making fiber optic couplers. Utilization of the invention in its entirety results in the completely automated production of a fiber optic coupler. However, portions of the inventive method and apparatus can be used to improve conventional methods of the type described above. Whereas the present invention is described in conjunction with the manufacture of overclad fiber optic couplers, certain of the apparatus components can be employed in the manufacture of fused biconic tapered couplers of the type wherein two or more fibers are fused together and elongated, without the use of an outer protective glass tube.

The present invention relates to an apparatus for the automated manufacture of fiber optic couplers. Fiber insertion means including adjacently disposed fiber guide tubes insert optical fibers into a glass tube. The fiber guide tubes have fiber input and fiber output ends, the output ends being movable longitudinally with respect to the bore of the glass tube. Means is provided for delivering the optical fibers to the input ends of the fiber guide tubes, with the first ends of the fibers passing through the fiber guide tubes and being deliverable from and retractable into the second ends of the guide tubes. Means is provided for sequentially tensioning each of the optical fibers and for stripping protective coating from the tensioned length of each of the fibers. The apparatus includes coupler draw means that is provided with upper and lower chucks for securing the glass tube at its end regions. The chucks are movable in opposite directions. First and second vacuum seal means evacuate the bore and maintain closed the ends of the glass tube after the stripped regions of the fibers have been inserted into the bore. Heating means heats the glass tube. Programmable control means control the operation of the apparatus.

The coupler draw means can include an upper clamping bar that engages an upper V-groove provided in the upper chuck and a lower clamping bar that engages a lower V-groove provided in the lower chuck; the clamping bars apply a repeatable level of force to the glass tube to secure it in the v-grooves.

The apparatus can include transfer means for transfering a glass tube from a storage magazine to the chucks. This apparatus can include a holding member provided with a groove, delivery means for delivering a tube from the magazine to the groove, and clamping means for gripping a tube. Means can be included for accurately locating the glass tube in the groove. When it is in a first position, the clamping means engages the glass tube held in the groove. The clamping means then moves to a second position and places the glass tube in the chucks of the coupler draw means.

The means for delivering the optical fibers to the fiber insertion means can include at least two optical fiber supplies, and a fiber feed mechanism for paying out a predetermined length of each of the optical fibers from the sources to the fiber insertion means. The programmable control means controls the fiber delivering means, whereby it measures the optical fibers to the predetermined lengths. That is, precise amounts of fiber are advanced from or retracted into the fiber delivering means.

The fiber feed mechanism can include input guide tubes for receiving the optical fibers from the reels, and output guide tubes that are connected to the fiber guide tubes of the fiber insertion means. A fiber extending between the input and output guide tubes is disposed between an idler roller and a motor driven roller. When the idler roller engages the motor driven roller, the fiber is delivered to or retracted from the output guide tube. Fittings are connected to the output guide tubes for introducing a gas therein for reducing friction between the fiber guide tubes and the optical fibers.

A lubricant dispensing tube can be disposed adjacent the fiber feed tubes and extend a distance beyond the ends of the feed tubes to lubricate the bore of the glass tube as the optical fibers are inserted therethrough.

The means for sequentially tensioning each of the optical fibers can include an upper and a lower stripping clamp between which a length of each of the optical fibers is sequentially clamped and tensioned, and the means for stripping the protective coating from the optical fibers can include a stripping nozzle movable transversely and rotatably with respect to the length of optical fiber that is tensioned between the stripping clamps. The stripping nozzle emits a jet of hot inert gas to strip the protective coating away from the length of fiber as the nozzle moves along the coated fiber.

The apparatus can include means for providing a low reflectance termination on an optical fiber. A ball termination torch is vertically and horizontally movable with respect to the optical fibers tensioned between the stripping clamps. After the torch severs the fiber, the strippingclamps retracting in opposite directions.

Bottom clamp means can be provided for clamping one or more of the optical fibers that extend from that end of the glass tube remote from the fiber insertion means.

The heating means is preferably located away from the chucks. After the stripped portions of the fibers are positioned in the tube bore, the heating means moves to a position adjacent the chucks. The heating means can be formed of two sections that close and surround the glass tube.

The upper and lower chucks partially shield the glass tube from the heating means, and in addition, the chucks are maintained at a controlled temperature by water-cooling to enhance process reproducibility.

After the midregion of the glass tube has been heated, the chucks are moved in opposite directions to stretch the tube. The means for delivering fibers and the upper chucks are preferably mounted on a first movable stage, and the lower chucks and the bottom clamp are preferably mounted on a second movable stage, whereby the means for delivering fibers and the bottom clamp move in opposite directions as the tube is stretched.

The apparatus can include dispensing means for dispensing glue into the bore of the glass tube, after a coupler has been formed and means for curing the glue after the glue has been dispensed into the bore. The means for curing the glue can comprise a UV light source sequentially positioned at each of the ends of the glass tube.

A further embodiment includes first and second fiber insertion means, each capable of inserting at least two optical fibers into a glass tube. The first and second fiber insertion means are each-provided with at least two adjacent fiber guide tubes that are movable longitudinally with respect to the tube bore. Means are provided for moving the first and second fiber insertion means laterally with respect to the bore. This apparatus is especially useful when used in conjunction with first and second means for forming stripped regions in each of the optical fibers. The first fiber insertion means can be disposed adjacent the glass tube when the second fiber insertion means is disposed adjacent the second means for forming stripped regions.

Yet another embodiment pertains to an apparatus for modifying an optical fiber. It includes means for delivering an optical fiber to a fiber guide tube such that the fiber can move out of and into the fiber guide tube. Means is provided for moving the fiber guide tube from one to another of a plurality of work stations. This apparatus can include means for moving the fiber guide tube toward and away from the first work station.

The invention also pertains to a method of automatically manufacturing a fiber optic coupler. A glass tube is placed into a coupler draw means where its end regions are gripped by upper and lower chucks. At least two optical fibers are delivered to a fiber insertion means. While a length of each of the optical fibers is tensioned between upper and lower stripping clamps, protective coating is stripped from each of the optical fibers, and the fibers are then inserted through the glass tube such that the stripped regions extend within the bore. The ends of the glass tube are evacuated, and the tube is heated. The end regions of the glass tube are drawn in opposite directions to form a tapered coupling region. The steps of the method are controlled by programmable control means.

The glass tube can be gripped in the coupler draw means by securing one of the tube end regions between an upper chuck V-groove and upper clamping bar, and securing the other end region between a lower chuck V-groove and a lower clamping bar, the upper and lower clamping bars applying a force to the glass tube to secure the glass tube in the upper and lower V-grooves. The upper and lower chucks can be maintained at a controlled temperature to improve process reproducibility.

The glass tube can be placed into the coupler draw means by automatically transferring the glass tube from a glass tube storage magazine to the draw means.

The optical fibers can be delivered to the fiber insertion means by paying out each of the optical fibers from fiber sources to fiber guide tubes of the fiber insertion means. The fiber guide tubes can move longitudinally with respect to the bore of the glass tube. A gas can be introduced into the fiber guide tubes to reduce friction between the fibers and the tubes and to remove debris from the fibers entering the guide tubes.

A stripped region can be formed on a fiber by positioning the fiber guide tubes above a lower stripping clamp, and delivering a length of an optical fiber is delivered through one of the fiber guide tubes to the lower stripping clamp which grips the fiber at a first location. The guide tubes are moved upwardly so that the upper stripping clamp can grip the fiber at a second location. The fiber is then tensioned between the first and second locations. A jet of hot inert gas is directed onto a predetermined region of the tensioned fiber to heat it and strip coating therefrom.

A low reflectance termination can be provided on an optical fiber prior to inserting it through the glass tube. The fiber is tensioned between two spaced points. A ball termination torch is moved from a given location in a given direction with respect to the optical fiber such that a portion of the flame severs the fiber into two pieces each having a tapered end. At least one of the tapered ends is retracted away from the other of the tapered ends. The torch continues to move such that the flame heats the retracted tapered end to cause it to become shortened-and rounded.

A lubricant is preferably dispensed into the glass tube when the optical fibers are inserted therethrough. This can be done by disposing a dispensing tube adjacent the fiber guide tubes, and dispensing the lubricant therefrom.

The method can further include dispensing glue into the uncollapsed ends of the bore of the glass tube after the tapered coupling region has been formed. The glue can initially be cured by directing UV light beams at each of the end regions of the glass tube while the glue is being applied to the ends of the bore, the flow of the glue stopping when it contacts the light beams. The glue can be further cured by sequentially positioning a UV light source at each of the end regions of the glass tube after the glue has been dispensed into the bore.

BRIEF DESCRIPTION OF DRAWINGS

FIG. 3 illustrates the spacial relationship between FIGS. 4 through 7.

FIG. 15b is a cross-sectional view taken along lines 15b—15b of FIG. 15a.

DETAILED DESCRIPTION

Overview of Invention

Figure 1:
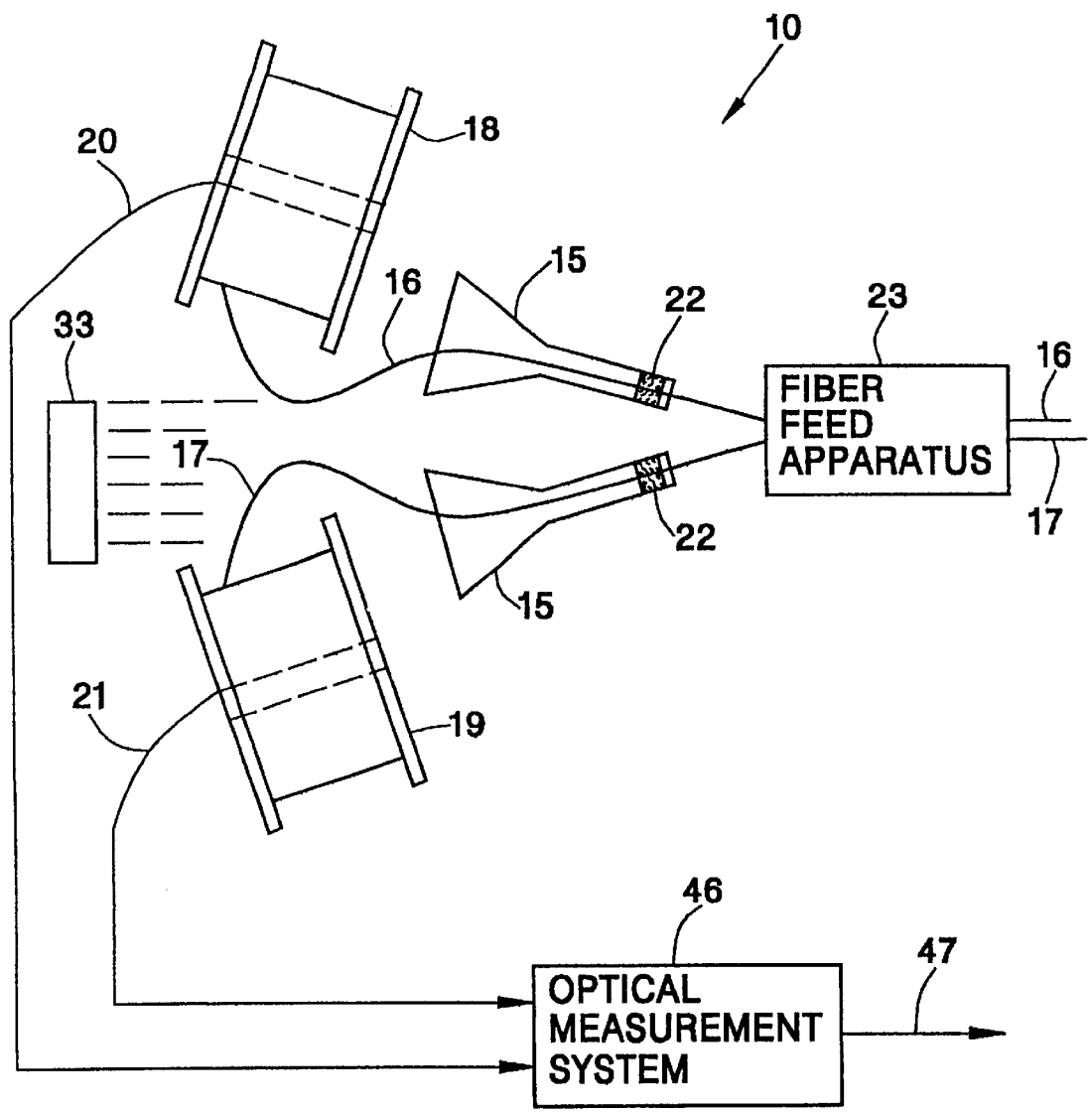
FIGS. 1 and 2 schematically illustrate an automated fiber optic coupler manufacturing apparatus.

A brief overview of the method and apparatus of the invention will be given by referring to FIGS. 1 and 2 which schematically illustrate an automated fiber optic coupler manufacturing apparatus 10. In connection with this description, as well as the following more detailed description, steps are described for making a 1×2 overclad fiber optic coupler. All references to x, y and z directions refer to the axes that are illustrated in various figures including FIG. 2.

(1) Tube transfer apparatus 11 including a tube gripper 14 delivers a glass capillary tube 12 from a storage magazine 13 to coupler draw apparatus 63 where its end regions are secured by upper and lower chucks 64 and 65, respectively. The chucked tube is designated 12'.

(2) Fibers 16 and 17 are delivered from reels 18 and 19, respectively, by fiber feed apparatus 23 to fiber insertion fixture 50.

(3) The fibers are sequentially fed from the fiber insertion fixture to a strip/terminate apparatus 56 where the fibers are sequentially secured within clamps 57 and 58 so that a section of coated fiber is tensioned between the two clamps.

(4) Stripping nozzle 59 emits a jet of hot inert gas that traverses a region of coated fiber to strip coating therefrom.

(5) When appropriate, end termination torch 60 severs the bare fiber that extends between clamps 57 and 58 and forms a low reflectance termination on one or both of the bare severed fiber ends.

(6) The fibers are inserted into the tube 12' so that the bare portions of the fibers extend within the bore of the tube. Valve 43 is actuated to dispense drops of alcohol from source 42 through dispensing tube 44 to the upper end of tube 12' to lubricate the bore as the fibers pass therethrough. Bottom clamps 69 are employed to pull and hold taut one or more of the fibers extending from the bottom end of tube 12' while they are being fed to the upper end thereof.

(7) The end of one or more fibers that extend through tube 12' are affixed to one or more optical fibers 47 which are connected to one or more light sources in measurement system 46.

(8) Bottom vacuum seals 67 are closed onto the bottom end of tube 12' to withdraw alcohol from the bore.

(9) Top vacuum seals 66 are closed on the top end of tube 12' and the bore of tube 12' is evacuated.

(10) Split burner 68 is ignited and closes around tube 12' to heat its mid-region.

(11) Top and bottom chucks 64 and 65, respectively, are traversed in opposite directions to stretch tube 12' and form a tapered coupling region.

(12) Vacuum seals 66 and 67 are opened.

(13) Light beams from upper and lower epoxy locating UV light sources (FIGS. 12 and 37) are directed toward the upper and lower ends of stretched tube 12'.

(14) Epoxy dispensing apparatus 72 moves to draw apparatus 63, and epoxy dispensers 73 and 74 are positioned at the top and bottom funnels of tube 12'. Epoxy is dispensed through needles into the funnels. As epoxy flows into the uncollapsed ends of the tube bore, the epoxy locating UV beams cure and prevent penetration of epoxy into the bore beyond a predetermined depth.

(15) The epoxy dispensing apparatus is withdrawn, and UV light apparatus 70 is sequentially positioned adjacent the top and bottom ends of the newly formed coupler to cure the epoxy. The epoxy locating Uw beams remain energized.

(16) The coupler body is released from the draw chucks. The fiber pigtails at the top of the coupler are metered to the desired length and are severed, whereby the coupler can be removed from the automated manufacturing apparatus.

Various components of apparatus 10 such as the motors, gas operated cylinders, clamping devices and mass flow controllers for methane and oxygen are controlled by programmable controller 79.

Description of Components

All of the components of manufacturing apparatus 10 are secured either directly or by way of supports, brackets and the like to backplate 200. Not all supports are shown. The orientation of elements with respect to backplate 200 is sometimes given relative to an x-axis, a y-axis or a z-axis. Backplate 200 lies in the x-y plane. Movement of an element in the +z direction means movement away from backplate 200 (out of the sheet of FIGS. 4 and 5).

Figure 8:
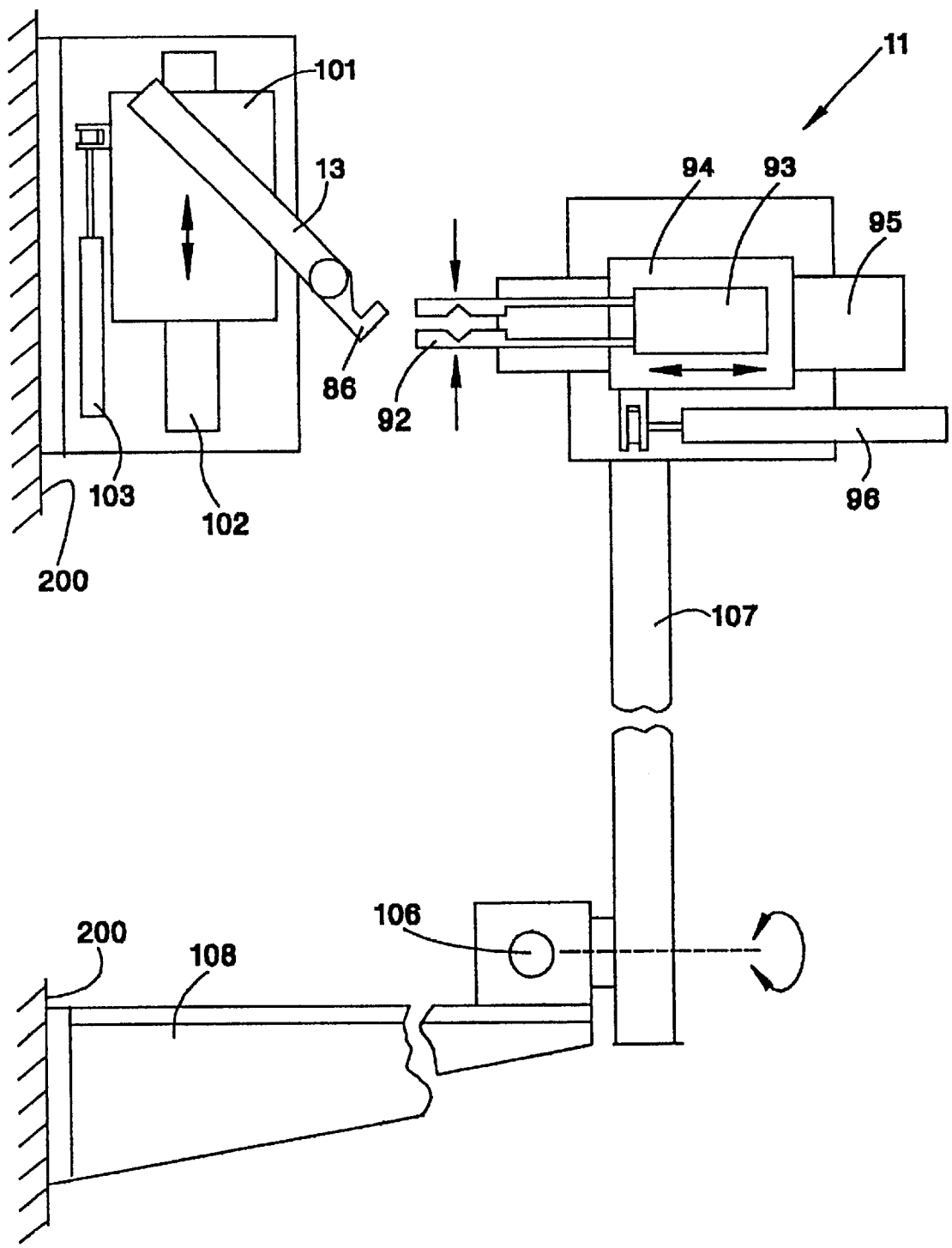
FIG. 8 illustrates a capillary tube transfer aparatus.
Figure 9:
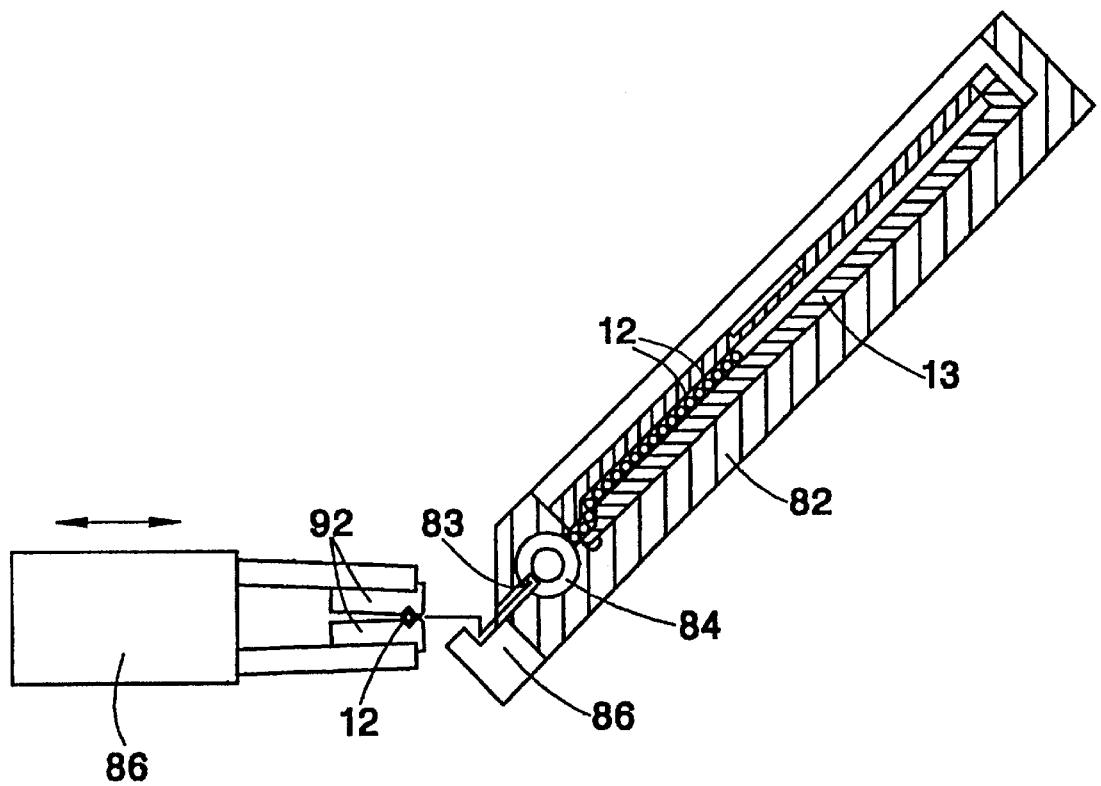
FIG. 9 is a cross-sectional view of the capillary tube magazine.
Figure 10:
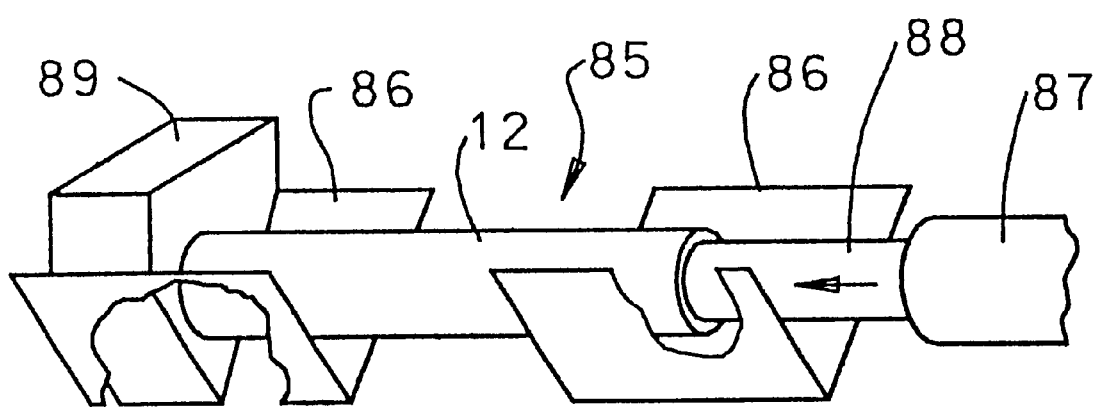
FIG. 10 schematically illustrates the tube positioning apparatus.

FIGS. 8–10 show the tube transfer apparatus 11 in greater detail. A slotted cylinder 84 is rotated $180°$E and then back again by a double piston rotary cylinder (not shown). This type of cylinder consists of two pistons that provide linear motion that is converted to rotary motion through a rack and pinion gear device. Capillary tubes 12 are stored in a magazine 13 and are gravity fed to a transfer position (the bottom of the stack of stored tubes) where they fall into slot 83. Magazine 13 sits in dispensing mechanism 82 which houses cylinder 84. When cylinder 84 rotates, a single tube is transferred to pick-up position 85 in spaced V-groove members 86. A cylinder 87 is actuated to cause piston 88 to position one end of tube 12 against stop 89 to precisely locate the tube. The location of stop 89 can be adjusted to accomodate different tube lengths.

Mechanism 82 is mounted on stage 101 that can be vertically reciprocated on slide 102 by actuating cylinder 103. Clamping device 93 is mounted on a stage 94 that can be reciprocated back and forth on slide 95 by actuating cylinder 96. Clamps 92 are biased open by a spring and are closed by actuating a double piston (pancake) cylinder located within mechanism 93.

Cylinder 96 is actuated to position clamps 92 around the tube that is located in the pickup position in groove members 86. Mechanism 93 is actuated to cause clamps 92 to engage tube 12, and cylinder 103 is then actuated to cause the Vgroove member 86 to be translated downwardly. Cylinder 96 is then actuated to retract the clamps away from the magazine.

Clamp slide 95 is mounted on an arm 107 that is rotatably connected to support bracket 108 by double piston rotary cylinder mechanism 106. When mechanism 106 is actuated, arm 107 rotates about $90_E$ and positions clamp mechanism 93 in alignment with the coupler draw apparatus 63 where the tube in clamps 92 is directly in front of the V-grooves of chucks 64 and 65.

Various modifications could be made to the disclosed dispensing mechanism. The tubes would not need to be gravity fed if means such as a spring were employed to supply them to cylinder 84. Moreover, cylinder 84 could be replaced by a wheel having a plurality of slots. A glass tube from the supply-of tubes would enter a slot of the slotted wheel and be rotated until it reached an orientation at which the tube would fall from the slot into grooves 86. Cylinder 84 could also be replaced by a pair of sequentially operated gates that are capable of preventing movent of the first two tubes in the linear supply of tubes. A first gate holding the last tube would retract so that the last tube could roll to grooved member, while the next to last tube is held by a second gate to prevent the remaining tubes from also rolling to the grooved member. The first gate then moves into position while the second gate retracts to permit the supply of tubes to roll to the first gate.

Figure 11B:
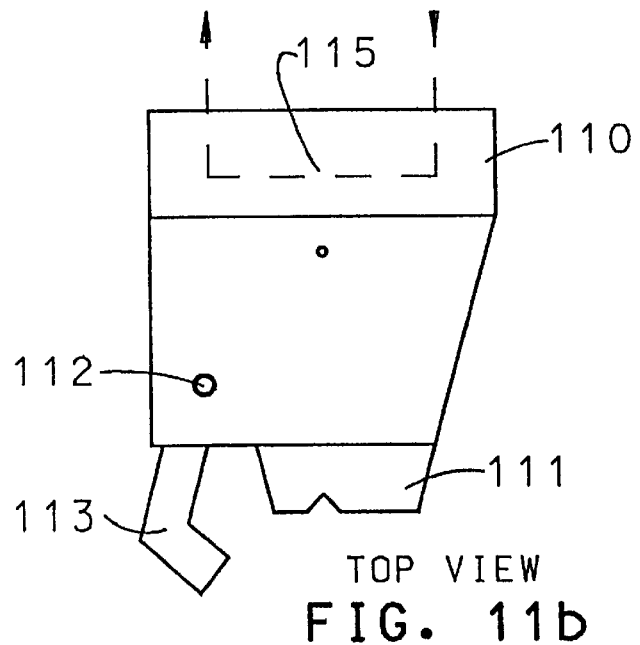
FIGS. 11a and 11b are side and top views, respectively, of the capillary tube retaining chucks.
Figure 11A:
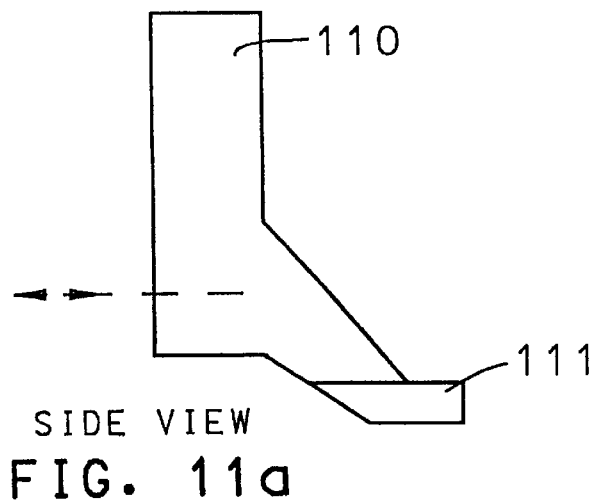
Figure 12:
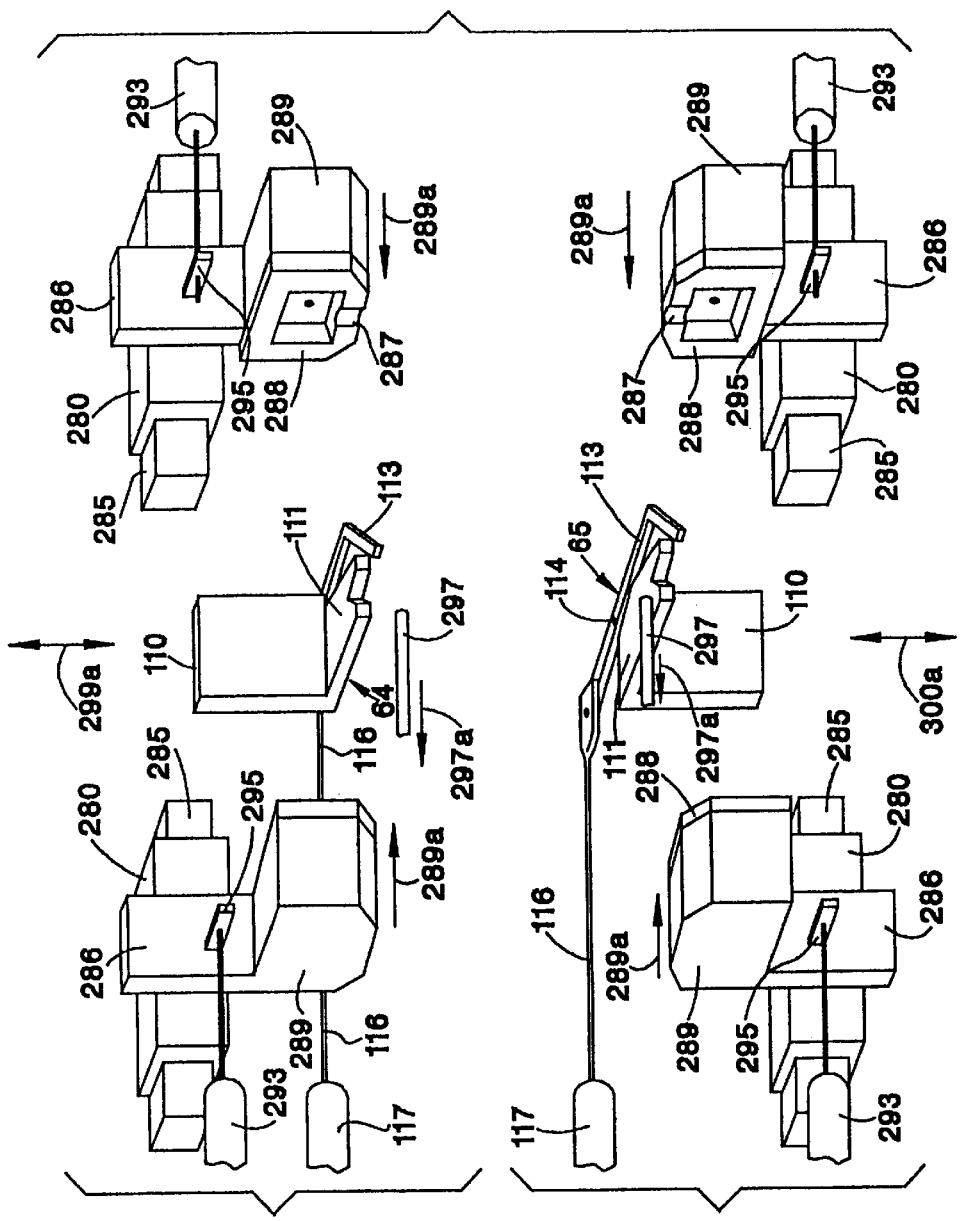
FIG. 12 is a schematic oblique view of the capillary tube retaining chucks and the vacuum seals.
Figure 27:
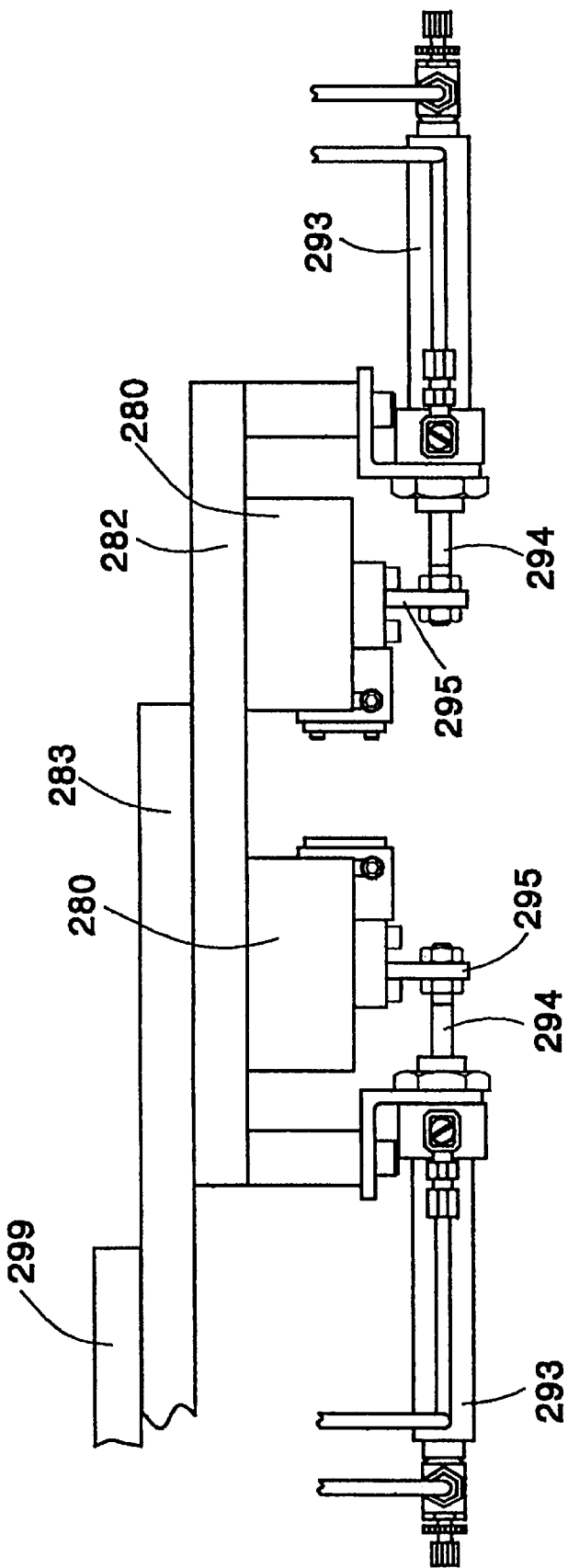
FIG. 27 is a top view of the vacuum seals.

Chucks 64 and 65 are shown in FIGS. 11a, 11b, 12 and 29. None of the support members are shown in the schematic view of FIG. 12. The chucks include a mounting plate 110 and a V-groove plate 111. Through a series of support members (also see FIGS. 27 and 28) the mounting plates 110 of upper and lower draw chucks 64 and 65, respectively, are affixed to vertically movable upper and lower draw stages 299 and 300, respectively (see FIGS. 4 and 5). All of the elements within the upper brackets of FIG. 12 are connected to upper movable stage 299 by support member 283, and all of the elements within the lower brackets are connected to lower movable stage 300 by support member 284. Tube clamping bar 113 is pivotally mounted in a recessed region adjacent plate 111 by a bolt 114 that threads into bore 112. Rod 116 of cylinder 117 is pivotally attached to bar 113.

After cylinder 96 (FIG. 8) has been actuated to position the tube (now designated 12') in the Vgrooves of the chucks 64 and 65, cylinders 117 are actuated to cause bars 113 secure the tube in the grooves.

Since the tube had been-precisely positioned in groove member 86 of the tube transfer apparatus, the ends of the tube are vertically positioned to within about 0.1 mm of the desired location in the coupler draw apparatus so that operations such as epoxy application can be properly performed. Properly positioning the tube also ensures that the coating edge of the stripped fiber will be positioned the proper depth in the tube funnel so that epoxy can be properly introduced into the funnel and bore of the tube.

The chucks are designed to achieve the automated loading of the capillary tube while also enabling a repeatable load level to be applied by bar 113 to the tube since bar 113 is actuated by air cylinder 117. The force applied by bar 113 to the tube can be controlled by regulating the air pressure applied to that cylinder.

The chucks partially shield the vacuum seals from the high temperature flame. When the vacuum seals are closed, the elastomeric seals 288 are shielded from the flame by the chucks. The water cooling of the chucks allows the coupler draw process to have a relatively short cycle time since the chucks would otherwise become so hot after a few couplers had been made that process consistency could not be maintained. The coolant water, which is pumped from a temperature controlled reservoir, maintains correct temperature regardless of timing differences between runs. Deviation of chuck temperature from a given temperature range affects the optical properties of the resultant coupler.

Apparatus for delivering fibers is shown in FIGS. 1, 2, 15a, 15b and 16. Fiber reels 18 and 19 are non-rotatably mounted and are so positioned with respect to feed apparatus 23 that fibers 16 and 17, respectively, that are coiled thereon, pay out to the fiber feed apparatus. The ends of fibers 16 and 17 opposite those ends that are delivered to fiber insertion fixture 50 constitute measurement pigtails 20 and 21, respectively, which are connected to detectors in measurement system 46. This arrangement is made possible since the reels are restrained from rotating. Management of the fibers extending between reels 18 and 19 can be facilitated by positioning guide funnels 15 between the reels and the fiber feed apparatus. The large ends of the funnels are positioned adjacent the spools. Optionally located in the small ends of the funnels are sponges 22 that are slitted or folded over to encompass the fiber that passes therethrough. The sponges, which are wetted with alcohol, wipe dust and debris from the fibers. Neither the funnels nor the sponges are needed for proper operation of the apparatus. A commercially available air deionizer 33 removes static electricity from the fibers. Such air deionizers can be positioned at various locations on the apparatus to blow deionized air onto the fibers.

If rotatable fiber reels were employed, measurement pigtails 20 and 21 could be connected to measurement system 46 by rotatable connectors. Moreover, the fibers need not be stored on reels. Rather, they could be merely coiled or be stored in boxes.

Figure 15A:
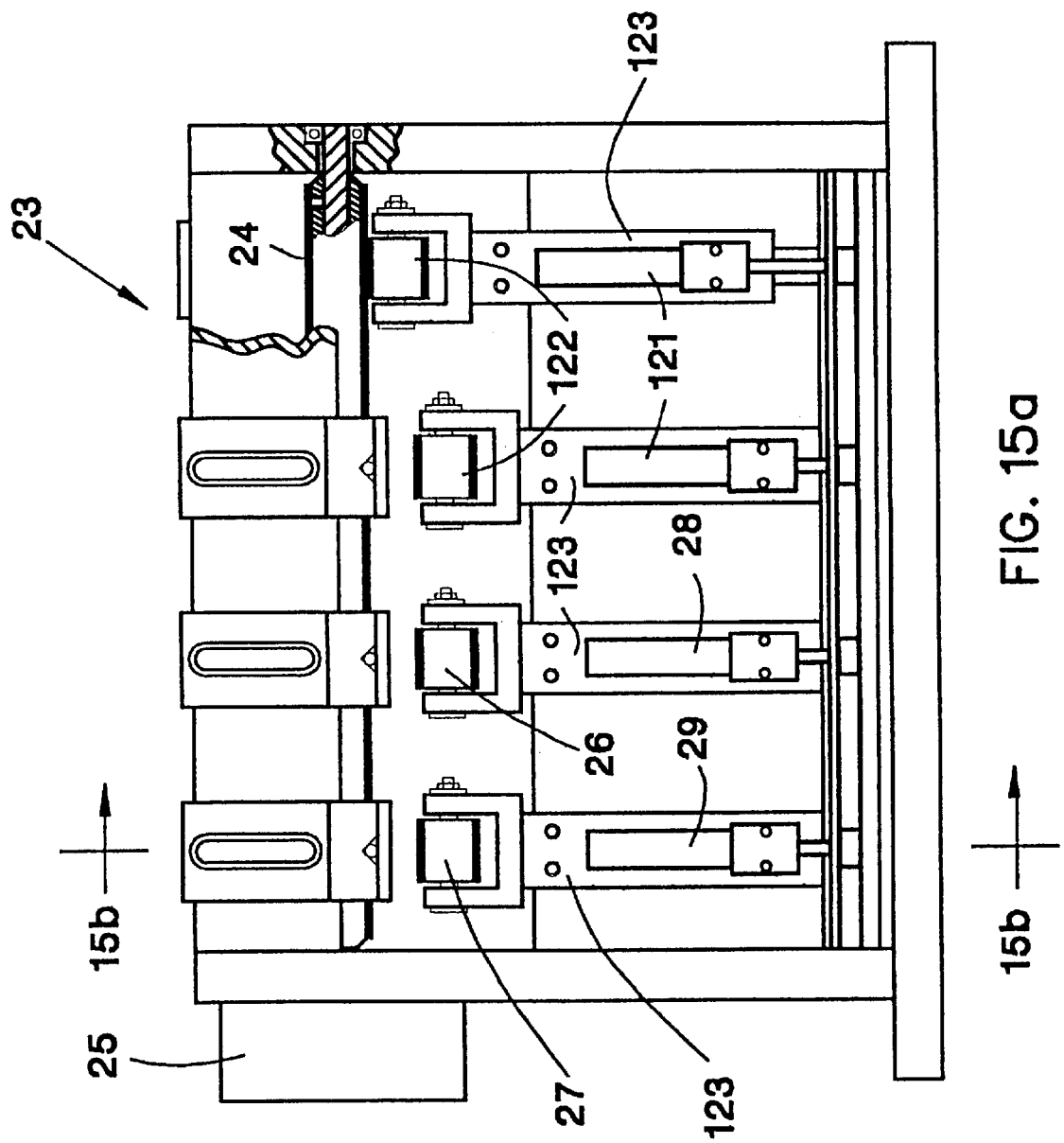
FIG. 15a is an end view in partial cross-sectional view of a fiber feed apparatus.
Figure 16:
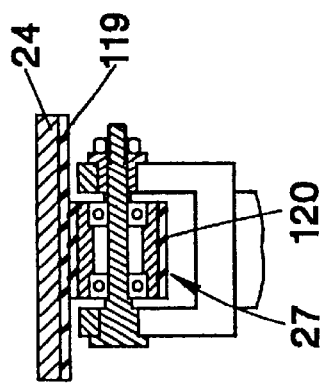
FIG. 16 is a cross-sectional view of an idler roller used in FIGS. 15a and 15b.
Figure 15B:
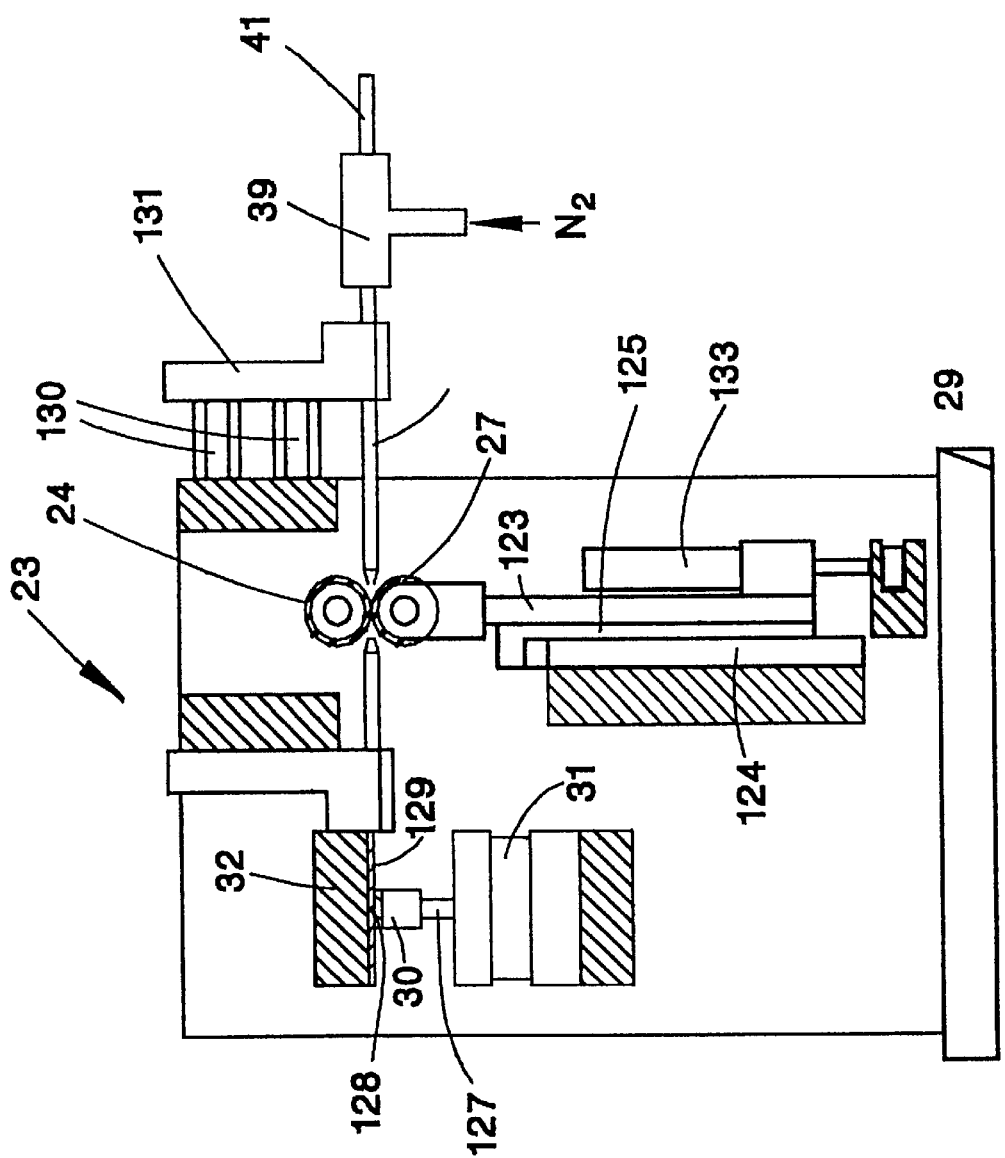

The cross-hatched portions of FIGS. 15a, 15b (except for the roller assemblies) are aluminum plates that are fixedly located in the apparatus. Roller 24 is rotated by reversible stepping motor 25. Located adjacent roller 24 are idler rollers 26, 27 and 122 which are actuated by gas operated cyclinders 28, 29 and 121. Roller 24 is provided with a rubber sleeve 119, and the idler rollers are provided with rubber sleeves 120. Cylinders 28, 29 and 121 normally receive a compressed gas input that biases rollers 26, 27 and 122 such that they are spaced from roller 24. Means such as a spring could also be employed to perform this biasing function. Whereas only the two idler rollers 26 and 27 shown in FIG. 2 are needed to form a 1×2 coupler, the device of FIG. 15b also includes two additional idler rollers 122 and their actuating cylinders 121. To supply more than four optical fibers, apparatus 23 could be provided with additional idler rollers. Alternatively, in addition to apparatus 23, another fiber feed apparatus similar to apparatus 23 could be employed in manufacturing apparatus 10. To feed ten fibers, for example, apparatus 10 could employ two fiber feed apparatuses, each feeding five fibers.

Cylinders 28, 29 and 121 are affixed to roller mounting plates 123 that are attached to movable stages 125 of ball slides. The fixed stages 124 of those ball slides are attached to aluminum plates within the housing. The piston rods are threaded in nuts that are located within fixed yokes. Cylinder 31 is a pancake cylinder from which extend two posts 127 that thread into the metallic block of the clamp 30 which is provided with a synthetic rubber layer 128. Bar 32 is also provided with a synthetic rubber layer 129.

The ball slides described herein, which were made by Daedal, Inc., Harrison City, Pa., include a stage having a U-shape cross-section and a ball slide positioned within the stage. Ball bearings, which are situtated in spaced openings in (racks) that separate the stage and slide, traverse along (tracks) in both the stage and the ball slide.

To feed optical fiber into fiber feed apparatus 23, the idler rollers and clamps 30 are retracted. The fiber is fed through an input guide tube 132, over the respective idler roller and into output guide tube 133 which is connected to T-fitting 39. Output guide tubes 133 are supported by brackets 131 that are positioned by spacers 130. A sufficient length of fiber is fed into the guide tubes to enable it to extend from the ends of the guide tubes at insertion apparatus 50. Clamps 30 are then closed. The protruding fibers can be cut by a mechanism (not shown) in apparatus 10, or they can be manually severed by bending them sharply at the point where they extend from their respective guide tube. The ends of the guide tubes are sufficiently sharp that the fibers become severed at the ends of those tubes. This is the starting position for the coupler making process.

T-fittings 38 and 39, located near the input ends 40 and 41 of the guide tubes, introduce a gas such as nitrogen, air or the like into those tubes. Gas flowing from the input ends 40 and 41 blows dust and debris from the fibers before they enter the tubes. Gas flowing through the guide tubes to the ends thereof at fiber insertion fixture 50 lowers the friction between the guide tubes and the fibers.

Motor 25 could be a d.c. servo motor or any other motor that can accurately rotate roller 24 and thus accurately position the fibers. Moreover, clamps 30 could be eliminated if a separate motor were employed for each set of rollers.

Fiber insertion apparatus 50 (FIGS. 2 and 4) is affixed to one end of a support arm 55, the other end of which is connected to a stage 52 which is vertically movable along track 54 as indicated by the arrow. Apparatus 50 includes a retaining tube 51 in which are disposed fiber guide tubes 35 and 36 and alcohol dispensing tube 44. Tubes 35, 36 and 44 are secured to the end of tube 51 by epoxy 45 (FIG. 13).

Tube 51 was formed of 0.343 cm inside diameter, 0.419 cm outside diameter, 8 gauge 304 stainless steel tubing. For delivering optical fibers having 250 μm outside diameter coating, tubes 35 and 36 were formed of 0.043 cm inside diameter, 0.064 cm outside diameter, 23 gauge 304 stainless steel tubing.

Retaining tube 51 and fitting 49 are employed so that tubes 35, 36 and 44 can easily be positioned relative to one another. However, retaining tube 51 and fitting 49 can be eliminated by merely gluing tubes 35, 36 and 44 together into a triangular array as shown in FIG. 13. The assembly of tubes can in turn be affixed to support arm 55.

Figure 14:
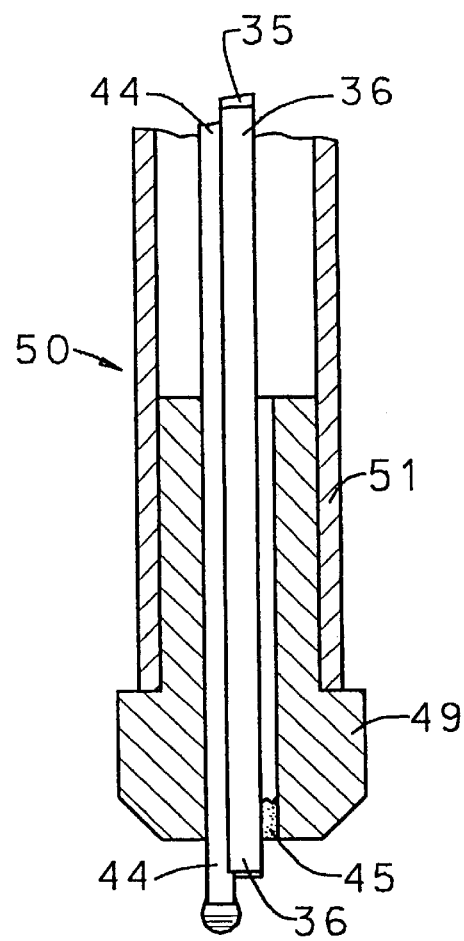
FIG. 14 is a cross-sectional view taken along lines 14—14 of FIG. 13.
Figure 13:
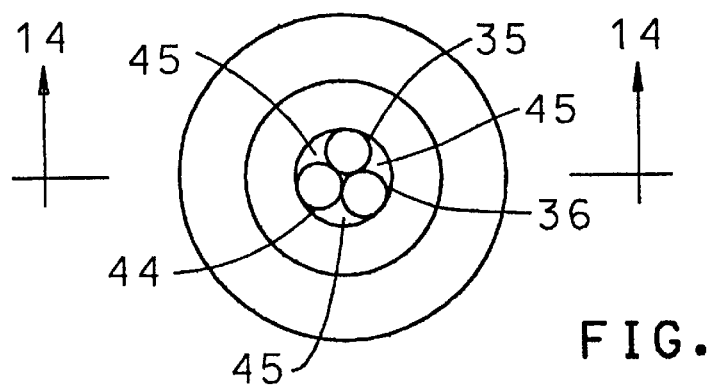
FIG. 13 is an end view of the retaining tube.

As shown in FIGS. 13 and 14, the end of retaining tube 51 fits over the smaller diameter portion of a brass fitting 49 and butts against the shoulder of the larger diameter end portion. Fitting 49 has a precision bore the diameter of which is just large enough to receive tubes 35, 36 and 44. Guide tubes 35 and 36 protrude a short distance from fitting 49. A drop 140 of alcohol is shown extending from dispensing tube 44 which protrudes farther than guide tubes 35 and 36 to prevent dispensed alcohol from flowing into the guide tubes.

Figure 17:
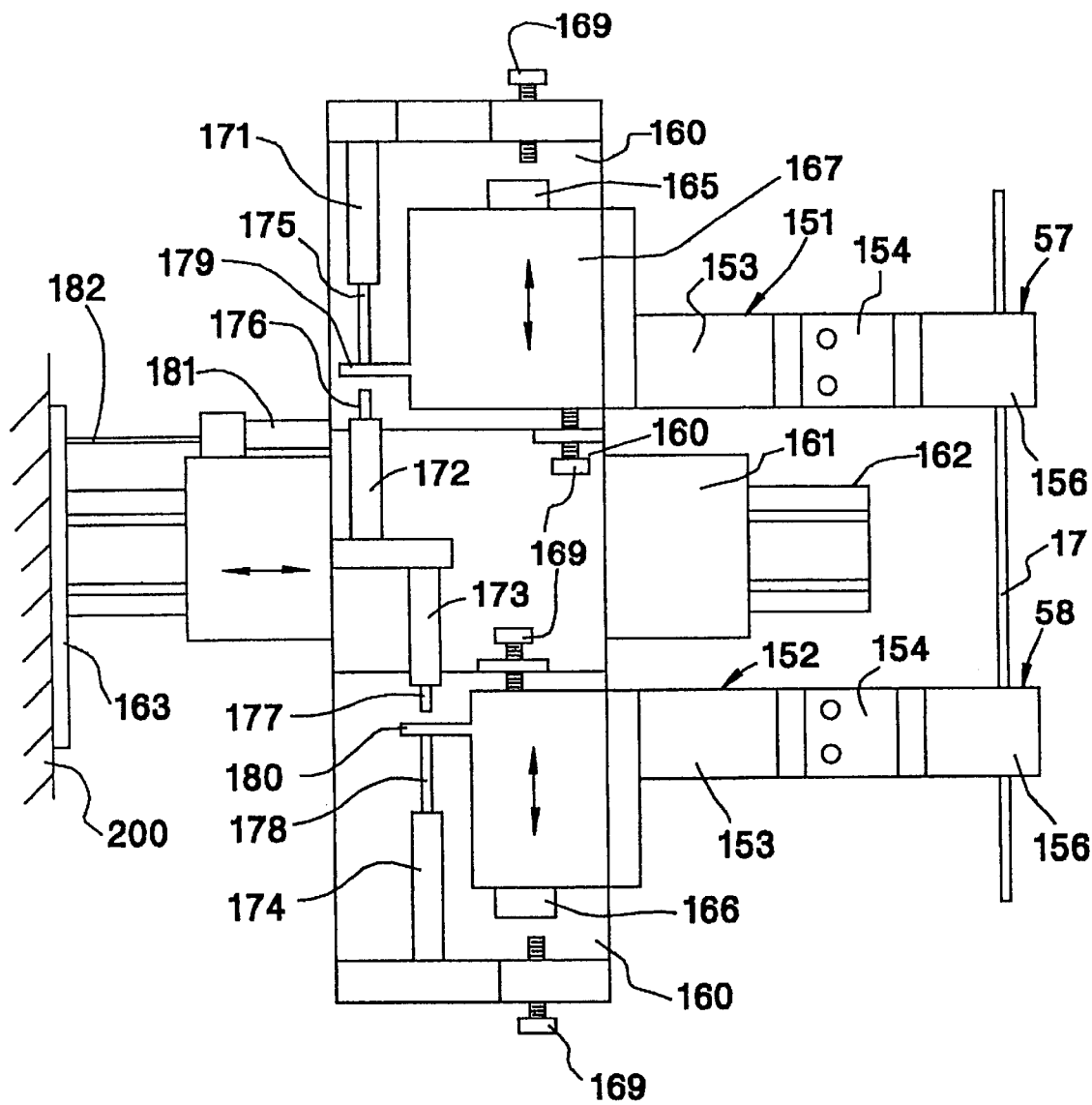
FIG. 17 is a side view of a pair of fiber tensioning clamps used in the fiber stripping, severing and end terminating operations.
Figure 18A:
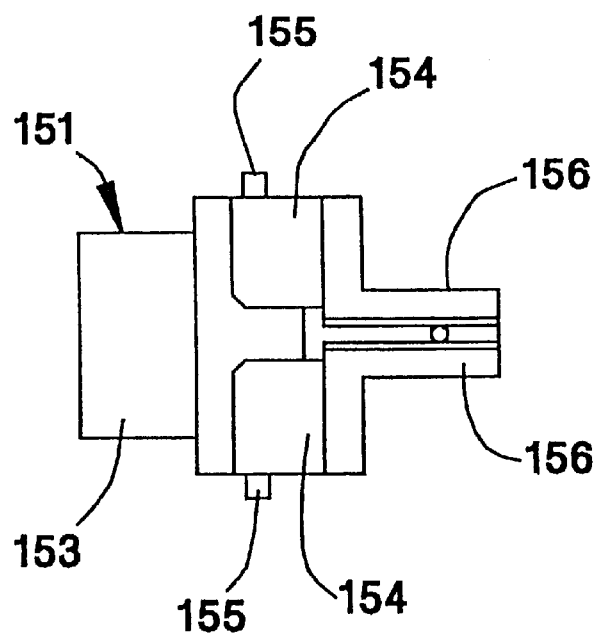
FIGS. 18a and 18b are top views of the fiber tensioning clamps.
Figure 18B:
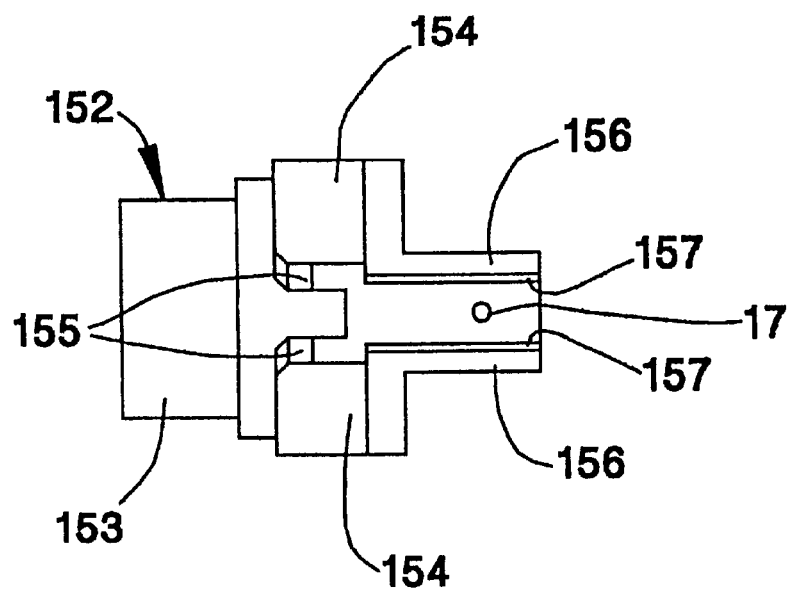

Strip/terminate apparatus 56 is shown in greater detail in FIGS. 17, 18a and 18b. The apparatus includes two air operated cam-action grippers 151 and 152 which consisted of Sommer ultramatic cam-action grippers Model No. GP-19. Each gripper consists of an actuator mechanism 153 that causes appropriate movement of laterally movable members 154 along cylinders 155. Affixed to members 154 are L-shaped members 156 to which a fiber gripping elastomeric layer 157 has been applied.

Base plate 160 is mounted on stage 161 which is movable along slide 162 which is secured to vertical support plate 163. Gas operated cylinder 181 is mounted on stage 161. Piston 182 of cylinder 181 is threaded into plate 163.

Mounted on base plate 160 are linear slides 165 and 166 on which mounting brackets 167 and 168 are movably mounted. The extent of movement of the mounting brackets 167 and 168 is restricted by adjustable screw stops 169. Four Clippard gas operated pistons (model No. SM-3) 171–174 are mounted to brackets on base plate 160. Pistons 175 and 176 are adapted to engage tab 179 protruding from stage 167, and pistons 177 and 178 engage tab 180 protruding from stage 168.

Figure 2:
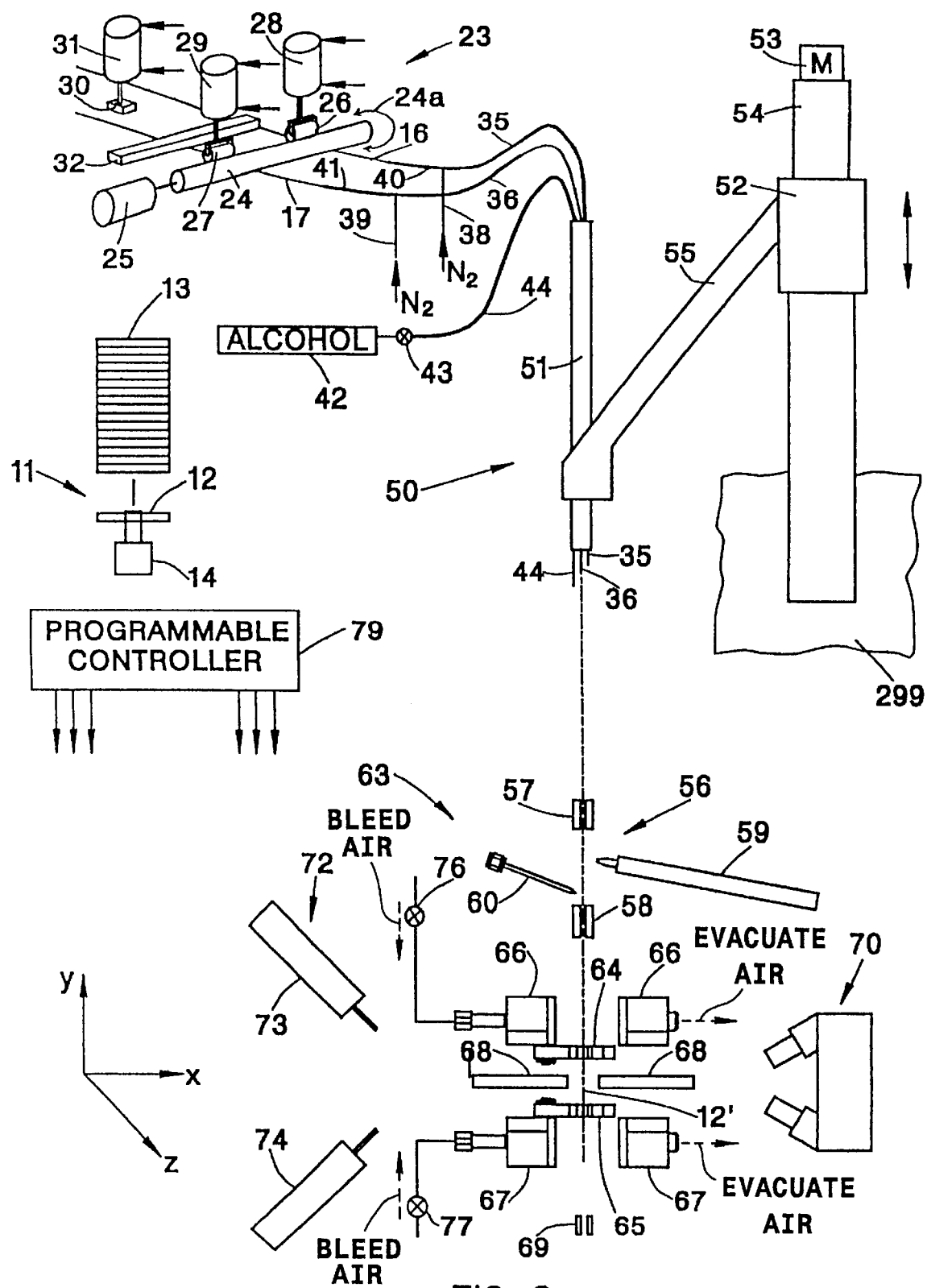

Stage 161 is normally retracted against support plate 163. cylinder 181 is actuated to move stage 161 away from plate 163 to a position along the z-axis where fiber 17 (extending from guide tube 36) extends between clamps 156 (clamps 57 and 58 of FIG. 2). Mechanisms 154 are actuated to cause clamps 57 and 58 to close on the fiber. Gas operated pistons 172 and 173 are actuated whereby pistons 176 and 177 engage tabs 179 and 180, respectively. This applies forces to the tabs that tend to move stages 167 and 168 in opposite directions, whereby coated fiber 17 is tensioned between clamps 57 and 58.

Figure 19:
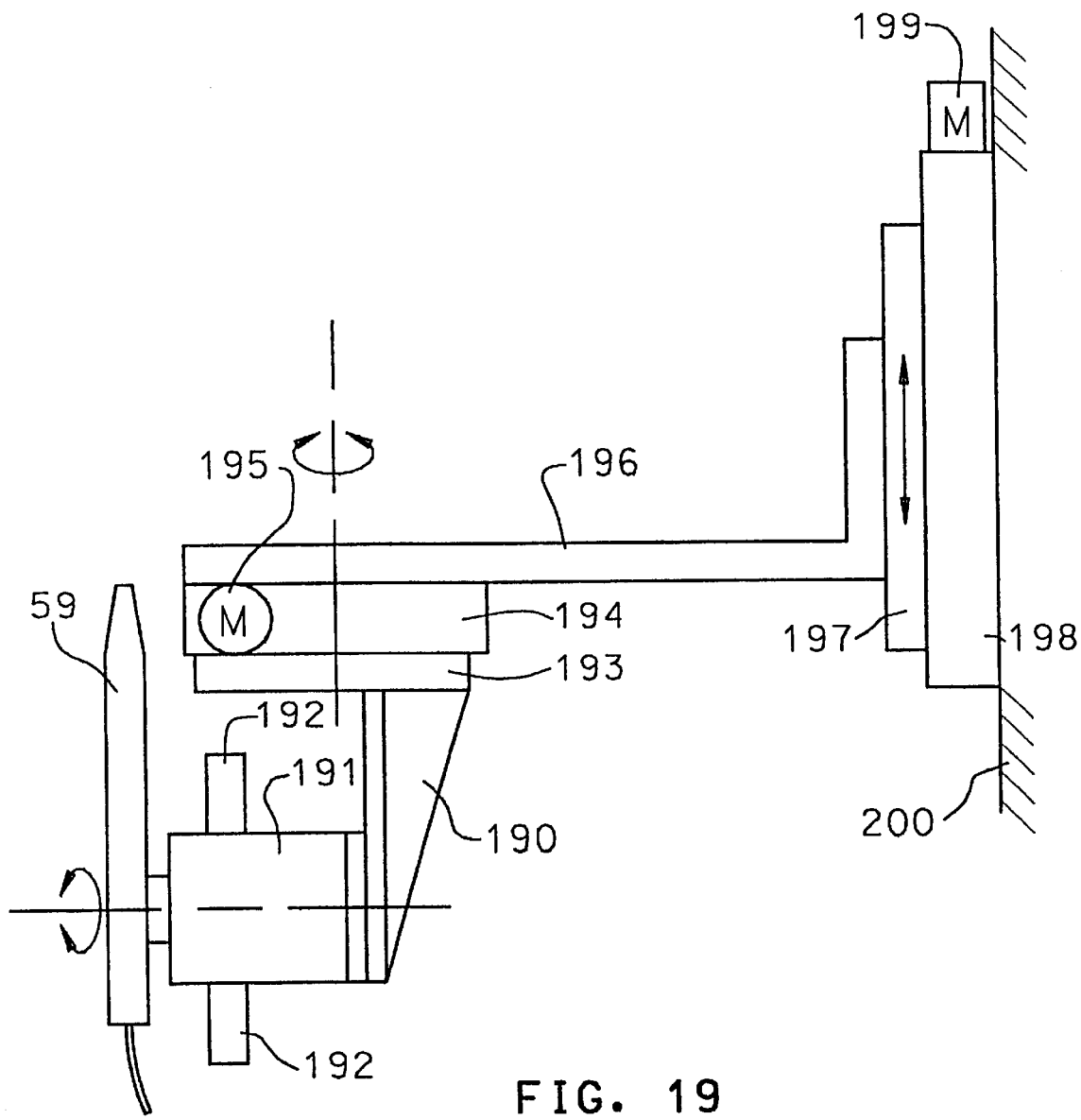
FIG. 19 illustrates the stripping nozzle positioning apparatus.

The apparatus for positioning stripping nozzle 59 is shown in FIG. 19. Stripping nozzle 59 is rotatably connected to support bracket 190 by double piston rotary cylinder mechanism 191. Support member 190 is affixed to the rotatable stage 193 of rotating mechanism 194 that is controlled by motor 195. Mechanism 194 is supported by an arm 196 that is affixed to stage 197 that is movable vertically along track 198 when motor 199 is energized.

When mechanism 191 is actuated by pistons 192, stripping nozzle 59 rotates to the horizontal position. Actuation of rotary mechanism 194 and motor 199 lowers stripping nozzle 59 and rotates it to a position directly in front of coated fiber 17.

Figure 20:
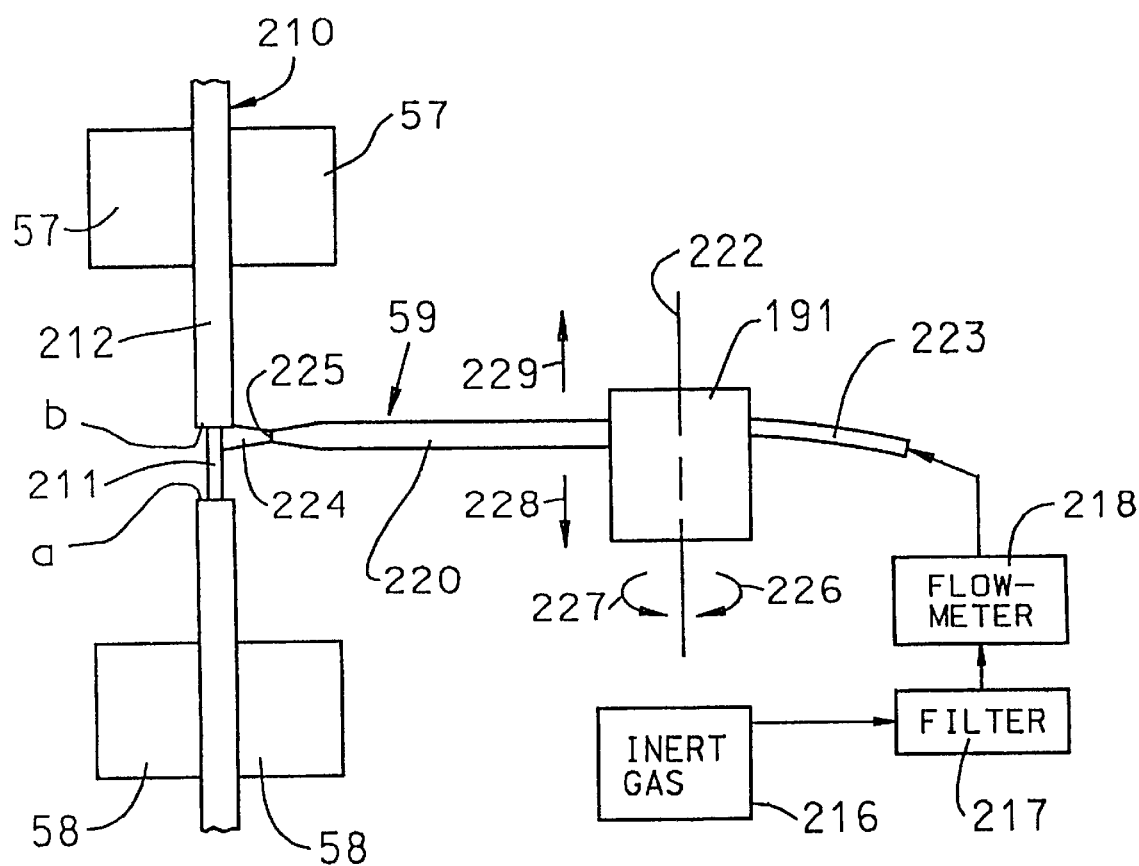
FIG. 20 schematically illustrates the operation of the coating stripping nozzle.

FIG. 20 illustrates the operation of stripping nozzle 59. The coated optical fiber 210 that was employed in the coupler manufacturing process was a conventional silica-based single-mode optical fiber having-an outside diameter of 125 μm. The optical fiber was provided with a urethane acyrilate coating 212 having an outside diameter of 250 μm. A source 216 of inert gas such as nitrogen was supplied through filter 217 and flowmeter 218 to the inlet pipe 223. A Convectronics Model 001-10002 tube heater was employed. The diameter of the outlet end of the nozzle was 1.76 mm. Nitrogen continually flowed at a rate of 20.9 standard liters per minute (slpm) into inlet pipe 223. Hot gas was discharged into vent 234 (FIG. 4) when the stripping nozzle was not in use. The voltage supplied to heater tube 220 was sufficient to provide a gas temperature that is adequate for melting the coating material. A temperature of about $820_E$C. is suitable for stripping a urethane acyrilate coating. Stripping nozzle 59 was mounted on a support apparatus 191 that provided it with the various degrees of motion described in connection with FIG. 19. To simplify this description of FIG. 20, apparatus 191 is described as being capable of rotating about axis 222 as indicated by arrows 226 and 227 and being capable of moving along axis 222 as indicated by arrows 228 and 229.

Figure 4:
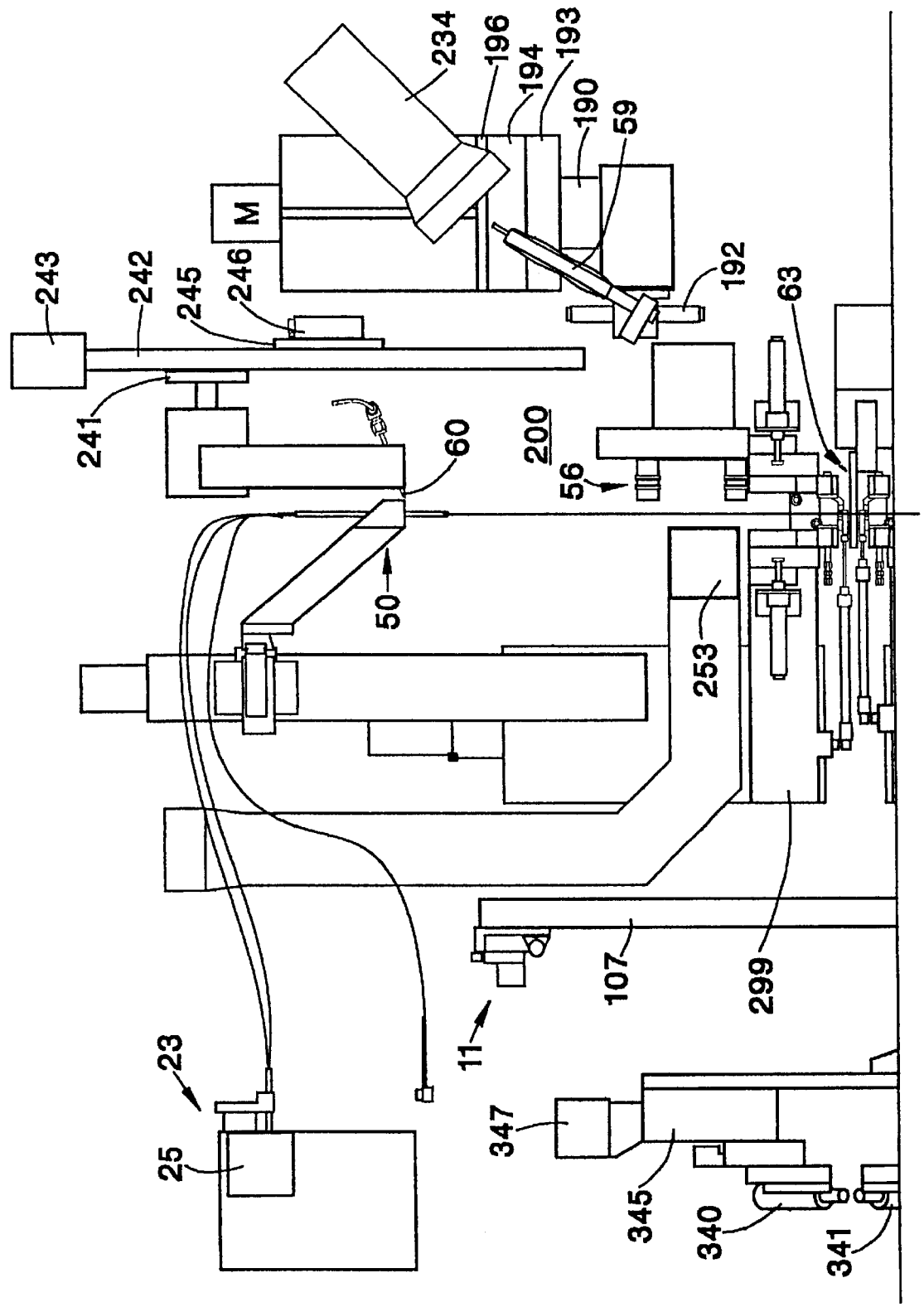
FIGS. 4 and 5 are front views of the top and bottom portion of the automated fiber optic coupler manufacturing apparatus.

Coating material 212 was to be removed from coated fiber 210 between points a and b along a section thereof that was held between clamps 57 and 58. Stripping nozzle 59 was rotated from its resting position to a horizontal orientation. It then traversed downwardly and rotated toward the coated fiber. Referring to FIG. 20, stripping nozzle 59 was rotated about axis 222 in the direction of arrow 226 until the jet of hot gas emanating from the tube heater nozzle 225 was directed a few millimeters to the side of coated fiber 210. After a short pause, it rotated to position the jet at point a of the coated fiber and immediately began to traverse along axis 222 in the direction of arrow 229. The distance between the end of nozzle 225 and the coated fiber during the fiber stripping operation was about 2.86 mm. As the hot nitrogen jet emanating from nozzle 225 moved along the coated fiber, coating material was softened and blown from the fiber. The removed coating material was discharged into vent 235 (FIG. 4). After coating material had been removed between points a and b along coated fiber 210, stripping nozzle 59 rotated about axis 222 in the direction of arrow 227 so that hot gas was no longer directed at the fiber. The exposed optical fiber 211 was sufficiently clean that it could be used in the coupler manufacturing processes without further treatment.

Figure 21:
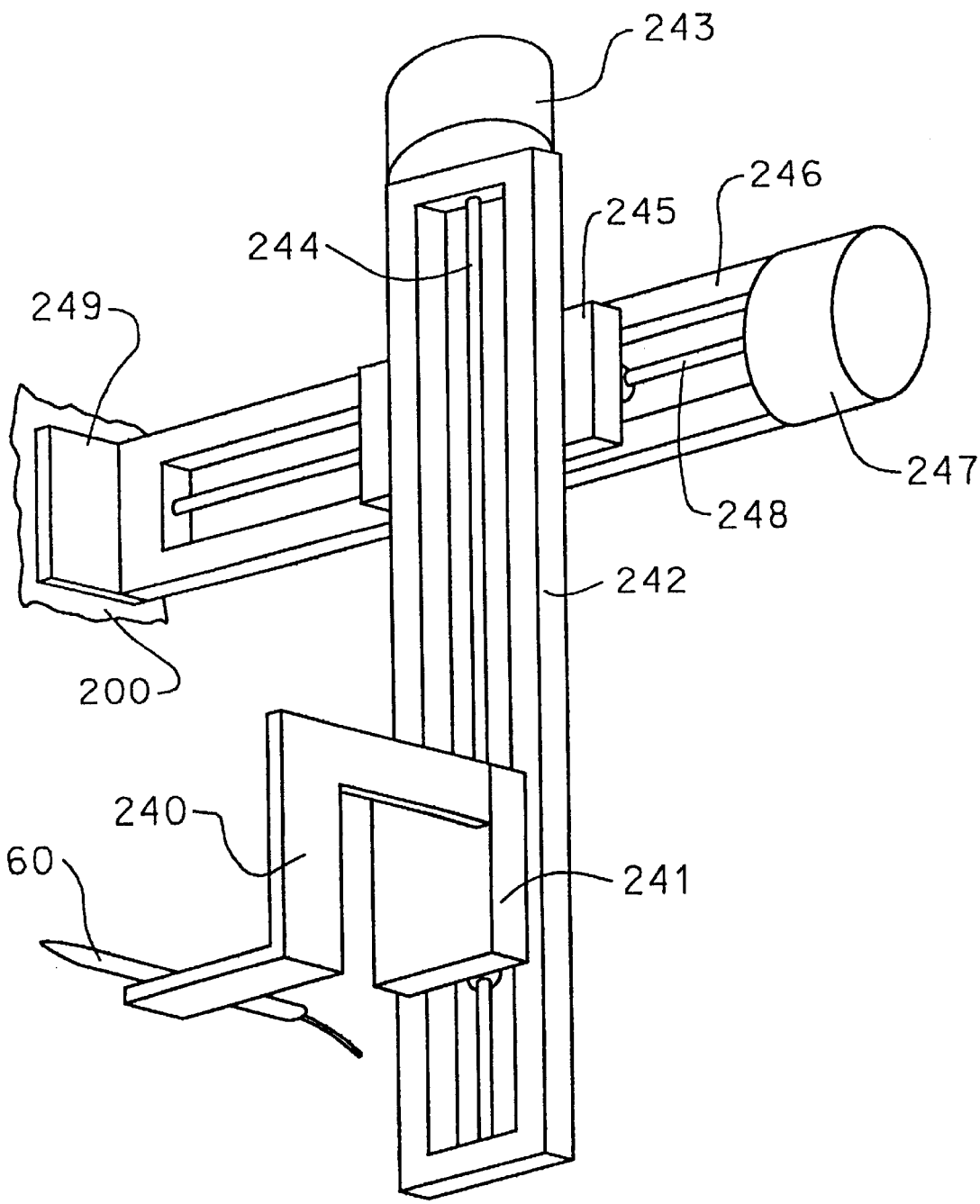
FIG. 21 is an oblique view of the apparatus that positions the fiber end termination torch.
Figure 22:
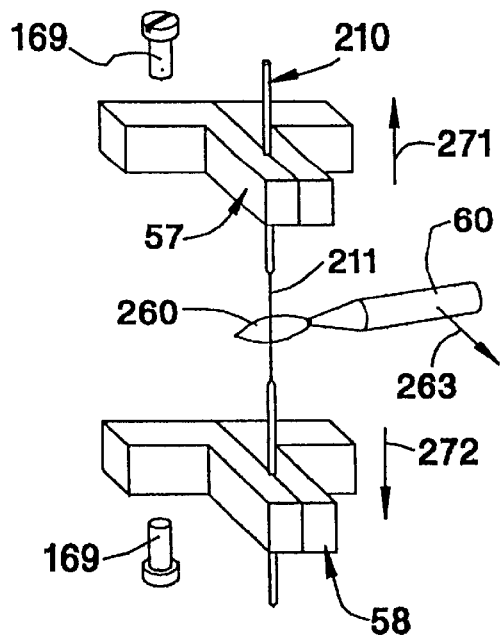
FIGS. 22, 23, 24 and 25 schematically illustrate the operation of the fiber end termination torch.

The low reflectance end termination apparatus of FIG. 21 forms on the ends of optical fibers the low back reflection termination that is required for high performance optical components. Torch 60 is connected to a vertical stage 241 by a support 240. Stage 241 is vertically moveable along track 242 as motor 243 turns threaded shaft 244. Vertical track 242 is affixed to stage 245 that is horizontally moveable along track 246 when motor 247 rotates threaded shaft 248. Track 246 is affixed to the vertical back plate 200 by bracket 249. In its inactive state, end termination torch 60 is positioned as shown in FIG. 4.

Figures 23, 24, 25:
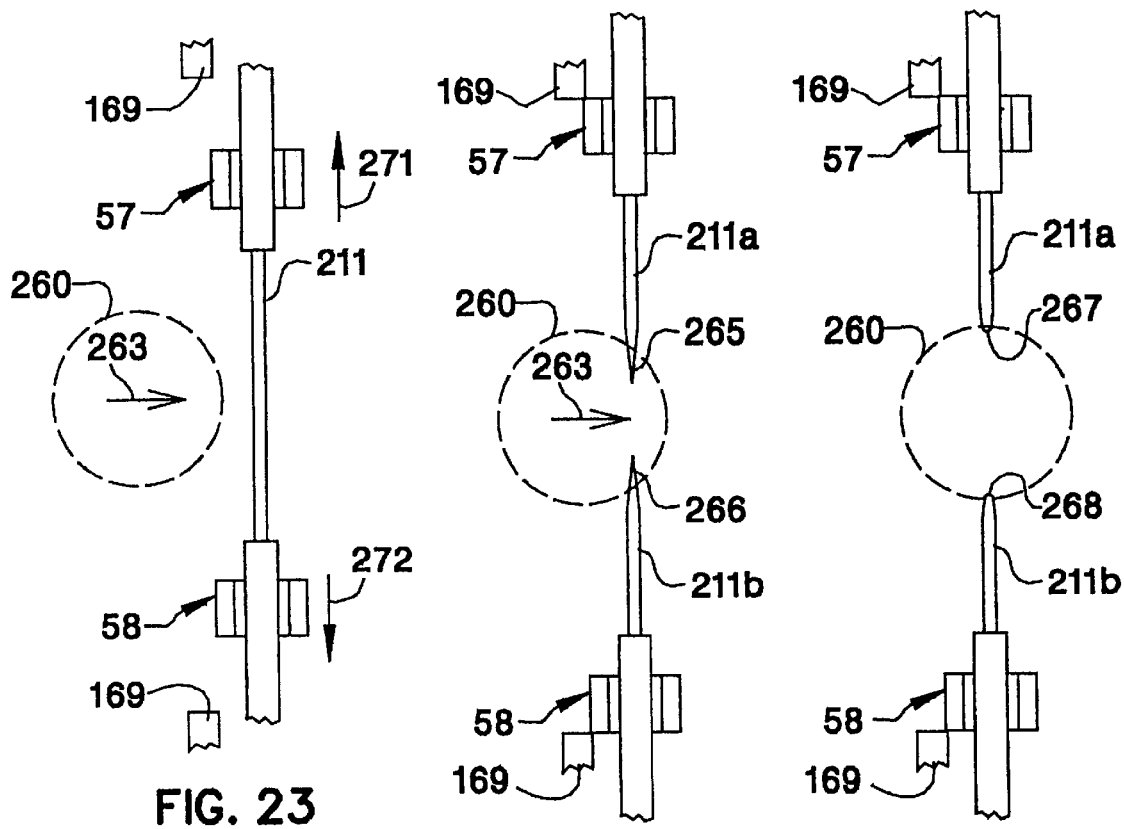

The operation of the fiber severing and end termination torch 60 is illustrated in FIGS. 22–25. Torch 60 had a size 2 tip (0.17 mm nozzle opening). A methane flow rate of 19 standard cubic centimeters per minute (sccm) and an oxygen flow rate of 25.5 sccm to the torch produced an adequate flame. The port velocity of the torch cannot be too high, or the tapered portion of the severed fiber will form a hook. Coated fiber 210 that had been.stripped as described in conjunction with FIG. 20 is tensioned between clamps 57 and 58. As previously described in conjunction with FIG. 17, cylinders 172 and 173 had been actuated (while cylinders 171 and 174 remain non-activated), whereby pistons 176 and 177 bear against tabs 179 and 180, respectively, tending to cause clamps 57 and 58 to move in opposite directions and thereby tension the fiber. After stage 241 had lowered torch 60 to the correct vertical position, stage 245 moved at a rate of 38.1 cm/minute to cause flame 260 to pass over fiber 211 at a rate sufficiently fast that the flame had essentially no effect on the fiber. The −z movement of the torch was stopped when the visible, peripheral portion of flame 260 was about 0.25 cm behind the fiber as shown in FIG. 23. Motor 247 was reversed, and stage 245 moved in the +z direction at a rate of 3.81 cm/minute. As the torch moved forward in the direction of arrow 263, the outer portion of the flame moved to a position shown in FIG. 24, thereby severing and forming tapered end regions 265 and 266. When the fiber became severed, clamps 57 and 58 moved in the direction of arrows 271 and 272 until the clamping mechanisms were stopped by set screws 169. When flame 260 reached the position illustrated in FIG. 25, tapered regions 265 and 266 had been heated to an extent sufficient to cause rounded end terminations 267 and 268 to form under the influence of surface tension. The resultant low reflectance termination had a typical back reflection less than about −55 dB.

If clamps 57 and 58 move the same distance (about 1–2 mm has been found to be suitable), a low reflectance ball termination will form on both of the tapered regions. If only top tapered region 265, for esample, is to be provided with a ball termination, clamp 58 can be moved a greater distance (perhaps a few centimeters) while clamp 57 moves about 1–2 mm, whereby only tapered region 265 is provided with a low reflectance termination, and tapered region 266 is moved out of the influence of the flame.

FIGS. 26–29 as well as FIG. 12 illustrate the operation of the apparatus which closes vacuum seals 66 and 67. Only the upper vacuum seals are illustrated in FIGS. 26–29. FIG. 12 is a schematic diagram that does not include any mounting brackets; it merely illustrates the relative positions of the chucks, vacuum seals and an initially operating pair of uv light sources. Elements included within the top bracket (see left side of drawing) are affixed to the top draw stage 299. Elements included within the bottom bracket are affixed to the bottom draw stage 300. Seal 66 is mounted by a bracket 286 to a stage 280 that is capable of horizontal movement along slide 285. Slide 285 cannot be seen in FIGS. 26 and 27 since it is located within stage 280 when the apparatus is in the neutral position that is illustrated. Ball slides 285 are affixed to support plate 283 by way of seal movement mounting plate 282. Support plate 283 is affixed to upper stage 299 of the coupler draw apparatus. To facilitate the precise positioning of the upper and lower draw stages 299 and 300 with respect to eachother, they can be affixed to a mounting plate (not shown) which is, in turn, mounted to backplate 200.

Figure 26:
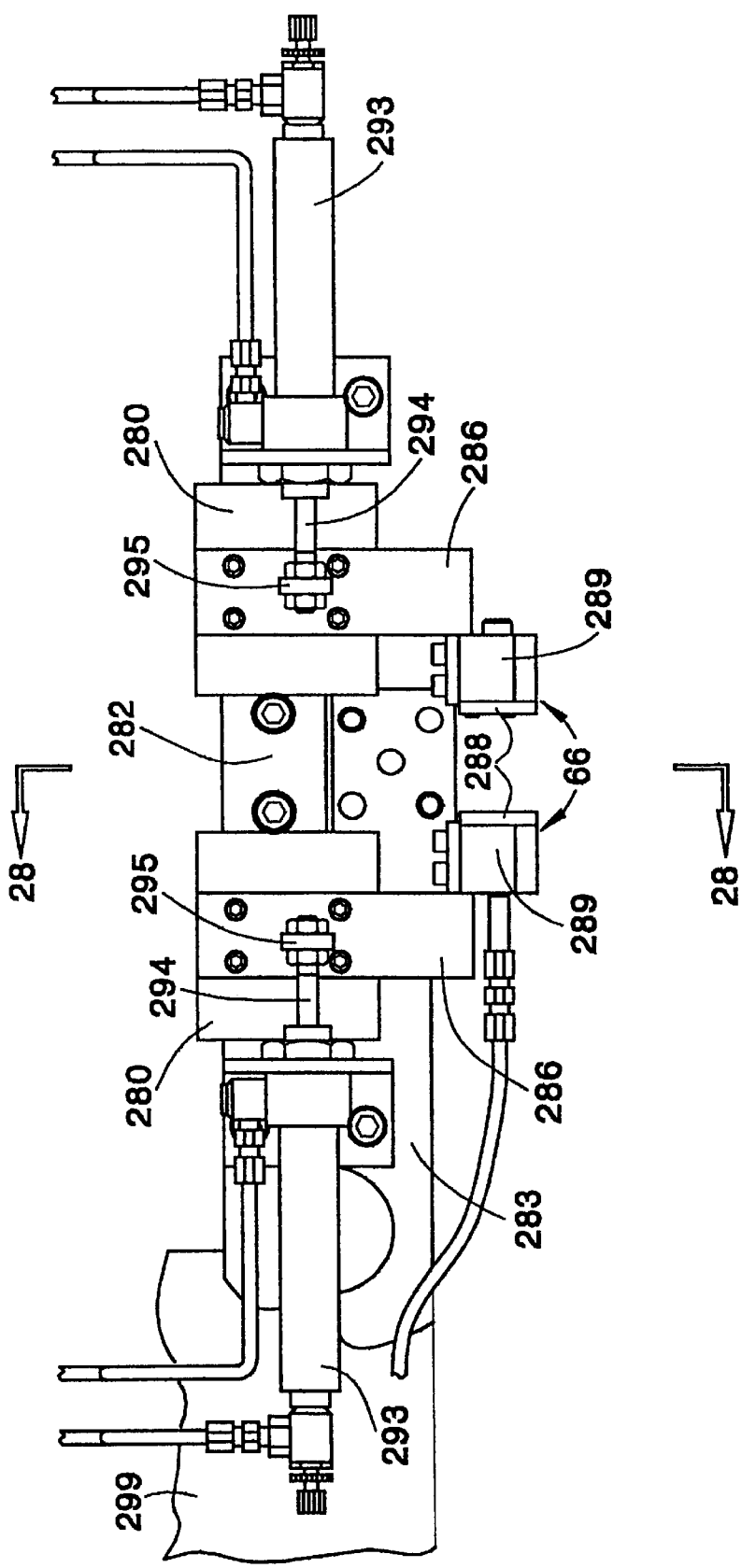
FIG. 26 is a front view of the vacuum seals.
Figure 28:
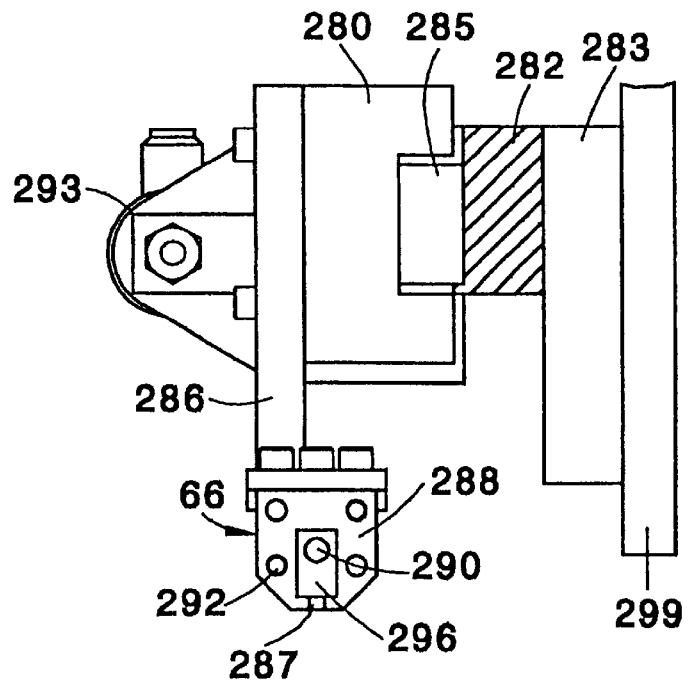
FIG. 28 is a cross-sectional view taken along lines 28—28 of FIG. 26 showing the left upper vacuum seal.

The upper left vacuum seal 66 is shown in FIGS. 26 and 28. An elastomeric seal 288 extends around the periphery of a face of metal backplate 289. Elastomeric seal 288 forms, along with the face of back plate 289, a cavity 296. A bore 290 in backplate 289, which communicates with cavity 296, is connected to blead valve 76 (FIG. 2). Blead valves 76 and 77 allow a controlled flow of air to enter upper left vacuum seal 66 and lower left vacuum seal 67, respectively. Elastomeric seal 288 is formed of Dow 591LSR, a flame resistant liquid silicone rubber. Seal 288 is glued the surface of backplate 289 with the same liquid silicone rubber from which the seal is made. The seal has four holes into which four locating pins 292 project in order to correctly position the seal on the face of backplate 289. A cylindrical. depression 287 at the bottom of the elastomeric seal receives the top of the capillary tube 12'.

Figure 29:
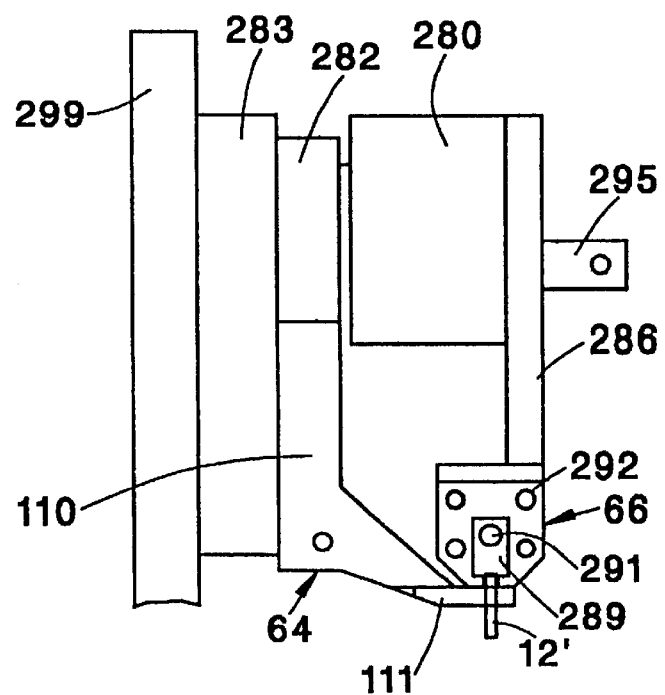
FIG. 29 is a side view showing the relationship between the tube retaining chuck and the upper right vacuum seal.

The upper right vacuum seal 66 (FIG. 29) is identical to the left upper vacuum seal except that bore 291 in backplate 289 is connected to a vacuum source. FIG. 29 also shows the relationship between the vacuum seal and the draw chuck 64. Chuck mounting plate 110 is affixed to support plate 283.

Associated with each vacuum seal is an air cylinder 293, the piston rod 294 of which is affixed to a bracket 295 extending from bracket 286. Cylinders 293 can be actuated to open or close the vacuum seals.

FIG. 12 shows two UV light sources 297 that are traversed to the position shown after the coupler has been drawn and the chucks have been opened. Sources 297 are turned on before epoxy is inserted into the ends of the tube bore, and they are turned off, along with sources 370 and 371, after the epoxy has been cured. The upper and lower UV sources 297 are attached to upper and lower stages 299 and 300, respectively, by four-bar links, whereby those UV sources both retract in the direction of arrows 297a and move away from eachother after the epoxy has been cured. The function of sources 297 is further described in U.S. Pat. No. 5,268, 014, which is incorporated herein by reference.

Figure 30:
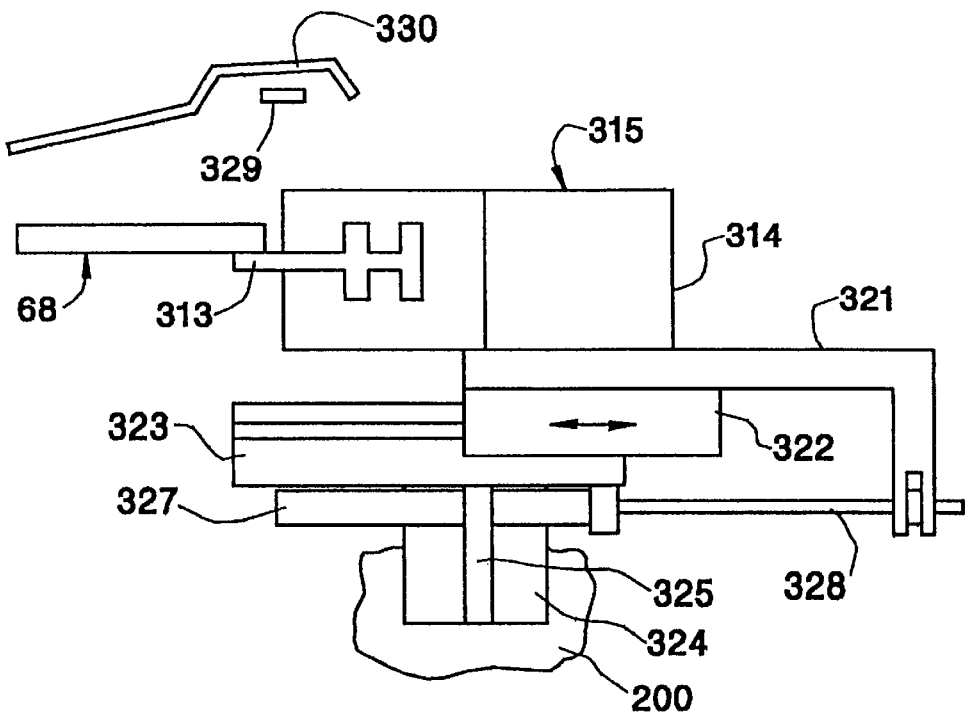
FIGS. 30 and 31 show side and top views, respectively, of the coupler draw apparatus burner.
Figure 31:
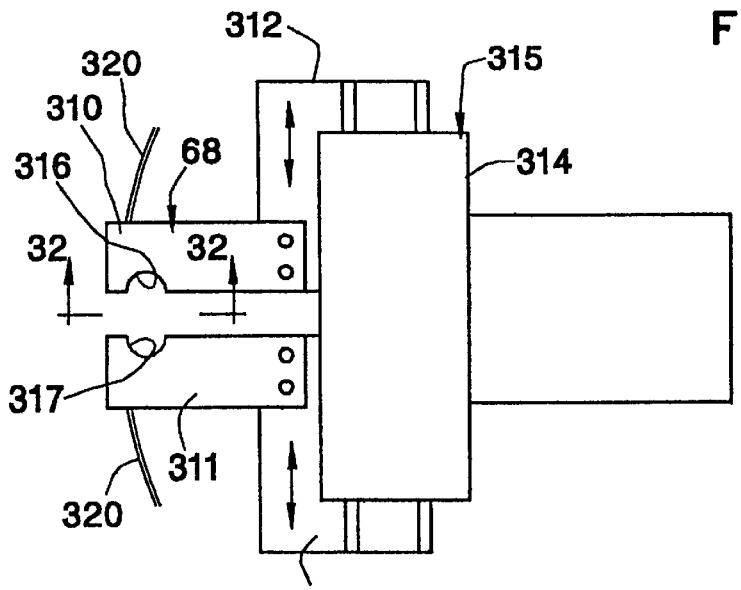
Figure 32:
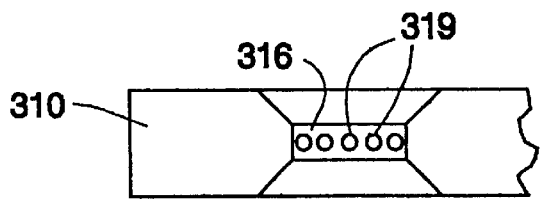
FIG. 32 shows a view taken along lines 32—32 of FIG. 31.

Burner 68 is shown in FIGS. 30–32. The burner comprises two sections 310 and 311 which are affixed to the laterally moving members 312 and 313 of PHD cam action gripper mechanism 315. The burner, shown in its open position, can be closed by actuating burner close mechanism 314. Sections 310 and 311 include annular regions 316 and 317, respectively, each having a plurality of flame ports 319. The distribution channels within the burner halves were symmetrical, whereby the flames emanating from each of the ports were substantially identical. Gas and oxygen are supplied to each burner section through lines 320.

Burner close mechanism 314 is affixed to a bracket 321 which is affixed to stage 322. Stage 322 moves in the direction of the double headed arrow along slide 323 which is affixed to support 324. Support 324 includes a rib 325 having an opening in which cylinder 327 is fixedly mounted. The end of cylinder rod 328 is connected to a yoke at the end of bracket 321. Support 324 is secured to back plate 200.

It is convenient to ignite the flame when the burner is in its retracted position shown in FIG. 30. During ignition (and during movement of the burner to tube 12') methane flows at the level that would be required to heat tube 12', but oxygen flows at a reduced level to reduce the amount of heat produced. When the gas and oxygen are turned on, these gases flow up the lower portion of flame shield 330 to silicon carbide resistance ignitor 329. When the gases ignite, the flame propagates in the +z direction through the channel formed by the flame shield to protect those components located above the burner. After the burner halves close around tube 12', the oxygen flow is increased to provide a sufficiently hot flame to soften the tube so that it can collapse and be stretched.

Figure 33:
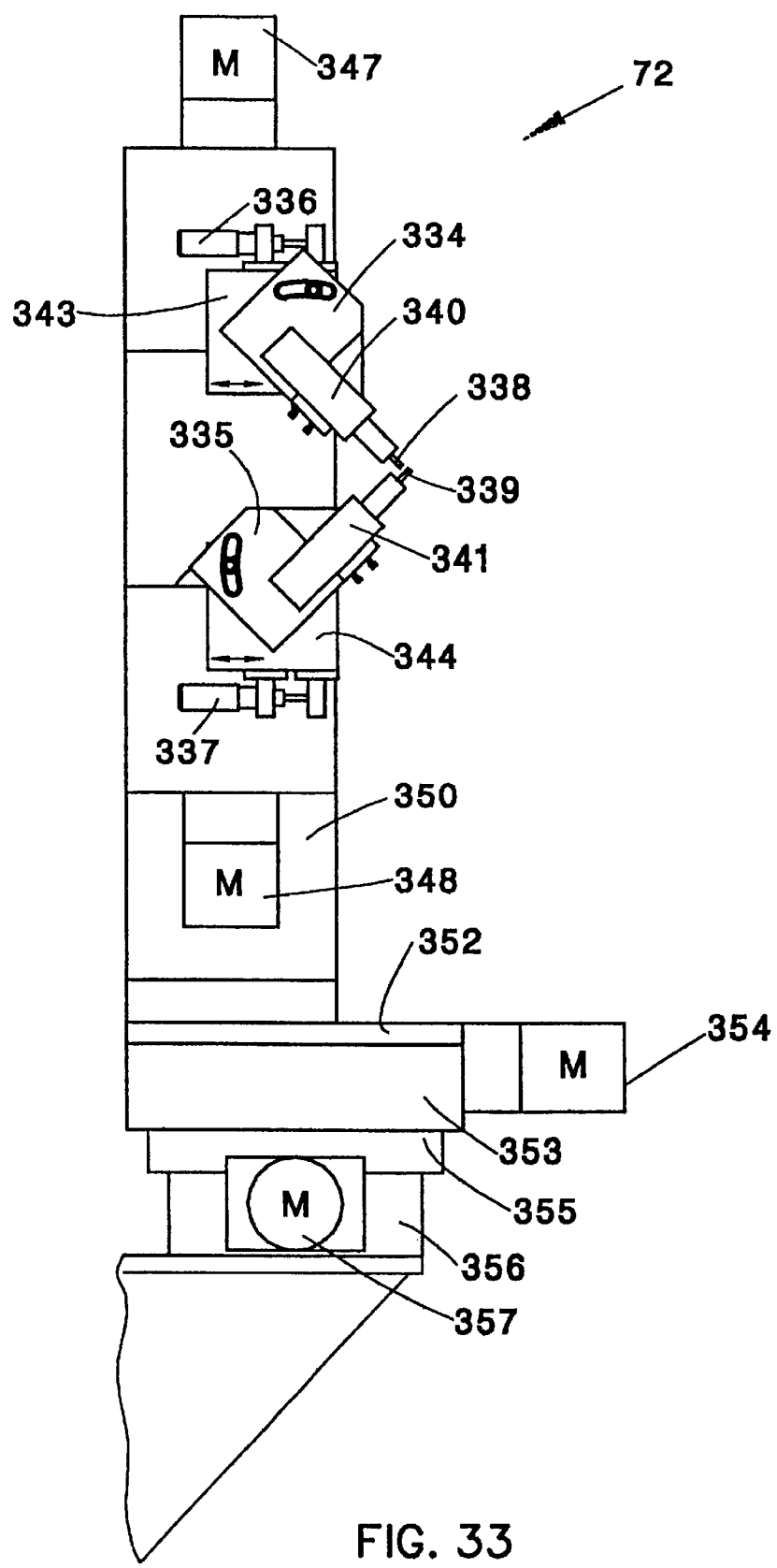
FIGS. 33 and 34 are.side and front views, respectively, of the epoxy application apparatus.
Figure 34:
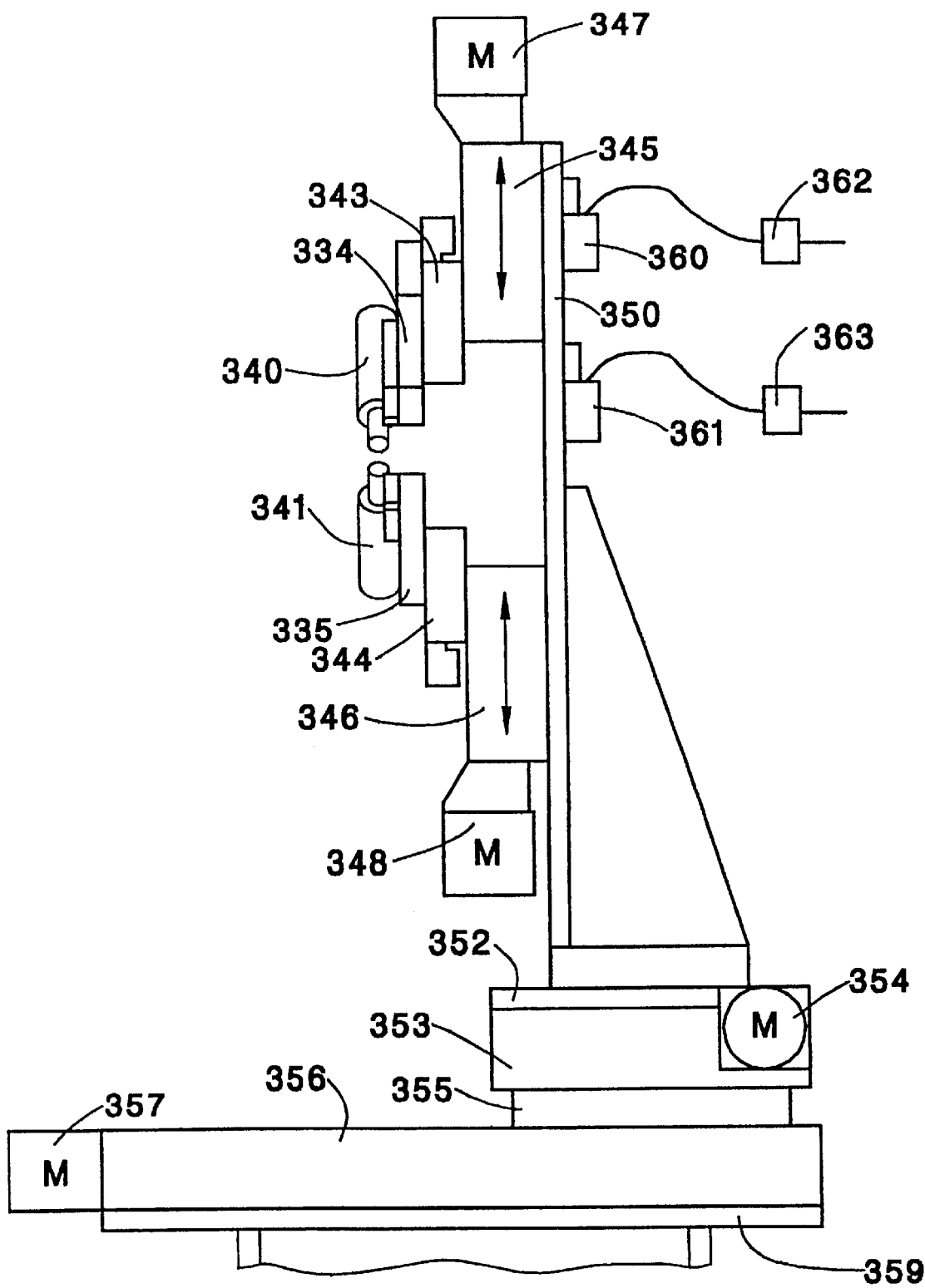

Epoxy application apparatus 72 is shown in FIGS. 33 and 34. Epoxy application devices 340 and 341 are TS 5000 rotary microvalves, which are electrically motorized auger feed mechanisms. Epoxy is delivered to mechanisms 340 and 341 from sources 360 and 361, respectively, which are pressurized by air supplied by valves 362 and 363, respectively. Epoxy from mechanisms 340 and 341 deliver the epoxy to the ends of the coupler through hypodermic needles 338 and 339, respectively (not shown in FIG. 34). Devices 340 and 341 are mounted by angular and horizontal adjustment devices to stages 345 and 346 which move vertically along tracks (not shown) when motors 347 and 348, respectively, are energized. The angular orientation of devices 340 and 341 can be adjusted by loosening a thumbscrew and pivoting mounting plates 334 and 335, respectively. Plates 334 and 335 are mounted on manual positioning stages 343 and 344 that provide horizontal adjustment in the plane of FIG. 33 when handles 336 and 337 are rotated. When the apparatus is in the dispensing position adjacent tube 12', the dispensing location of the needle tips can be adjusted by the aforementioned angular and horizontal adjustment devices.

Stages 345 and 346 are mounted on a support member 350 which is mounted on a rotary stage 352 which rotates with respect to base 353 when motor 354 is energized. Base 353 is affixed to stage 355 which is translatable along track 356 in the x-direction when motor 357 is energized. Track 356 is mounted to back plate 200 by mounting bracket 359.

Figure 35:
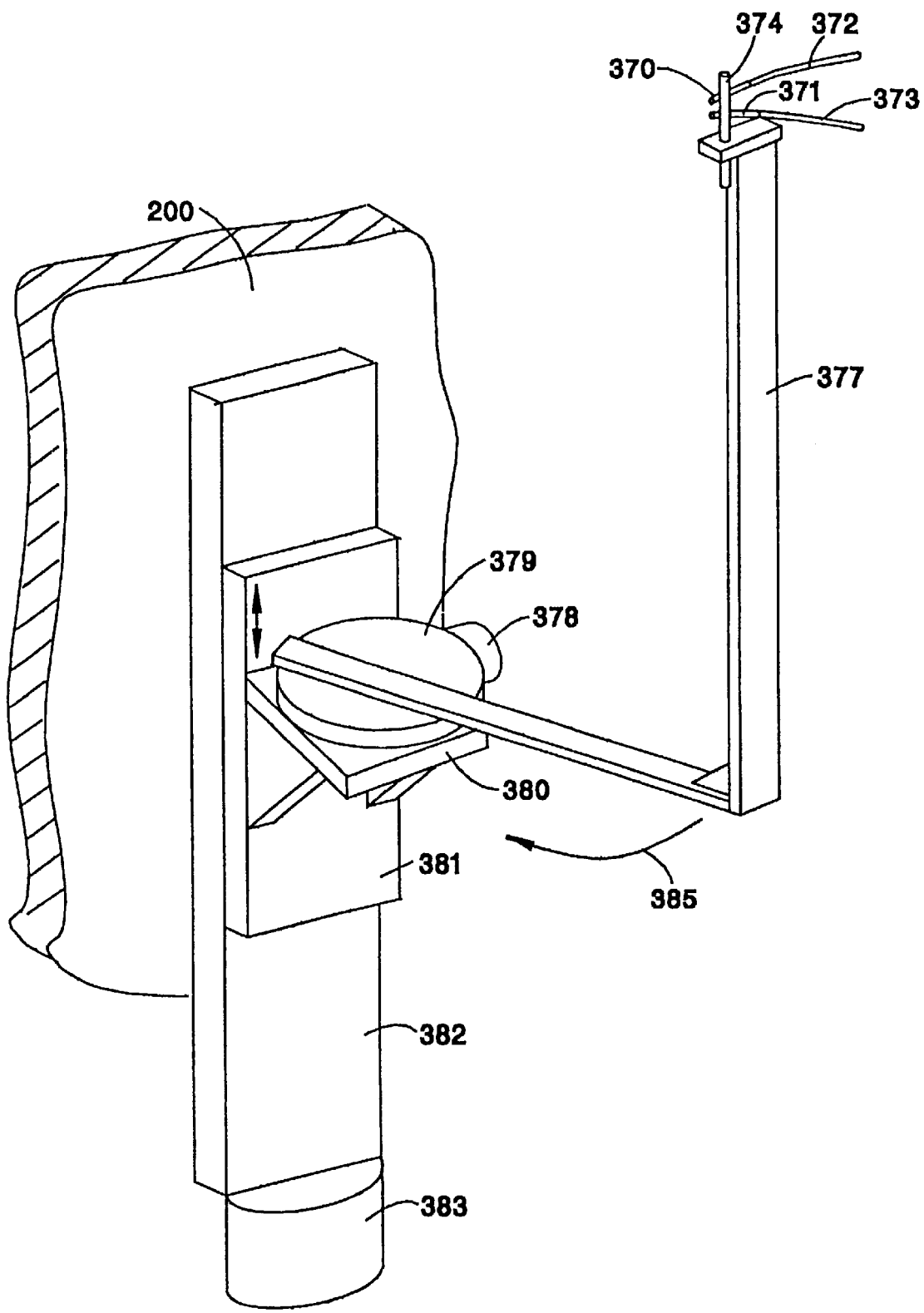
FIG. 35 is an oblique view showing the UV light source positioning apparatus.

Apparatus for positioning the UV light source is shown in FIG. 35. Light is supplied to UV light sources 370 and 371 by light guide cables 372 and 373, respectively. Sources 370 and 371 are affixed to a post 374 that is connected to the top end of L-shaped support arm 377. The opposite end of arm 377 is affixed to rotary stage 379 which rotates upon base 380 when motor 378 is activated. Rotary stage base 380 is mounted to a linear stage 381 which moves vertically along track 382 when motor 383 is activated. The resting position of arm 377 is shown in FIG. 35.

Figure 5:
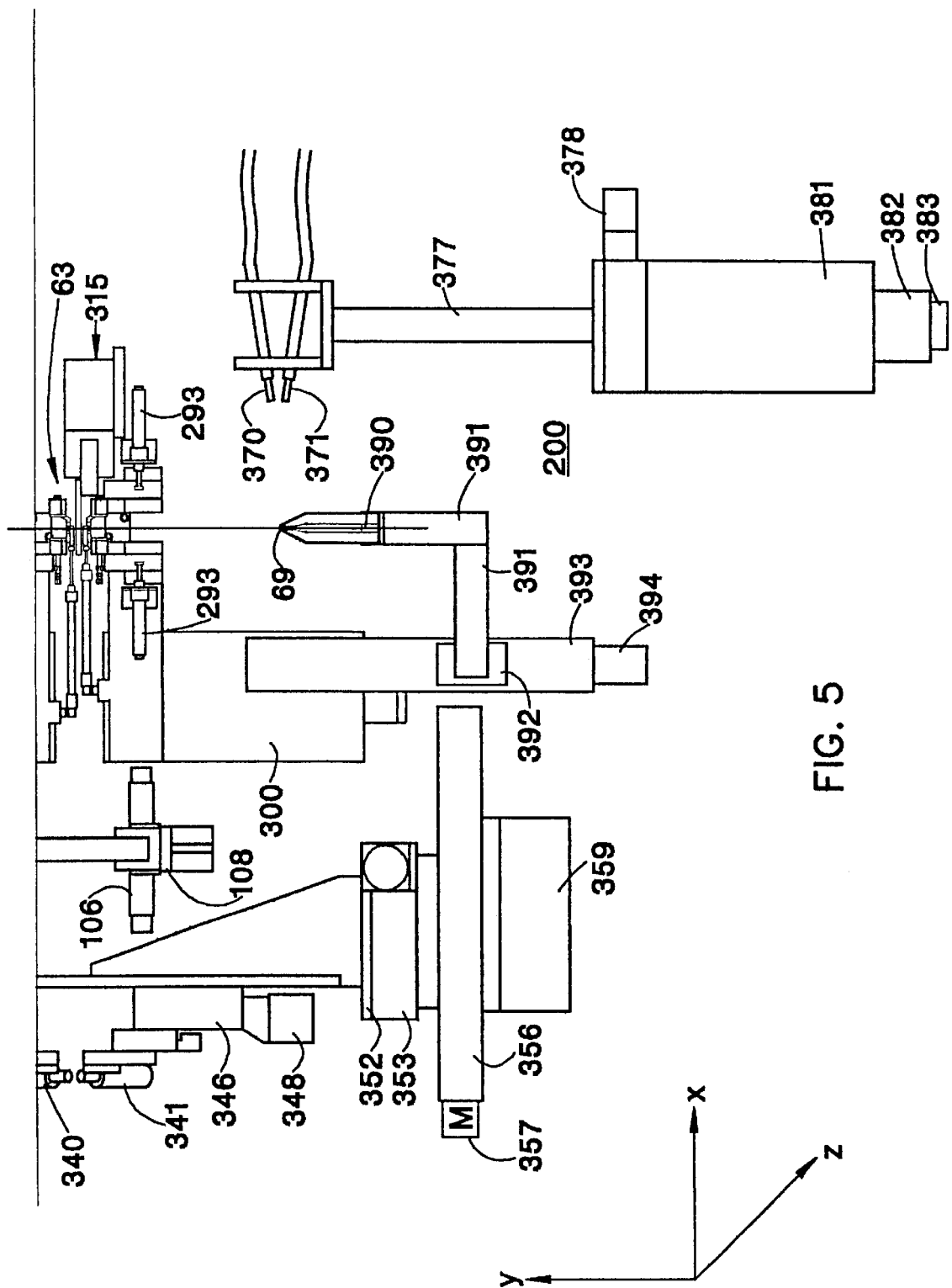
Figure 6:
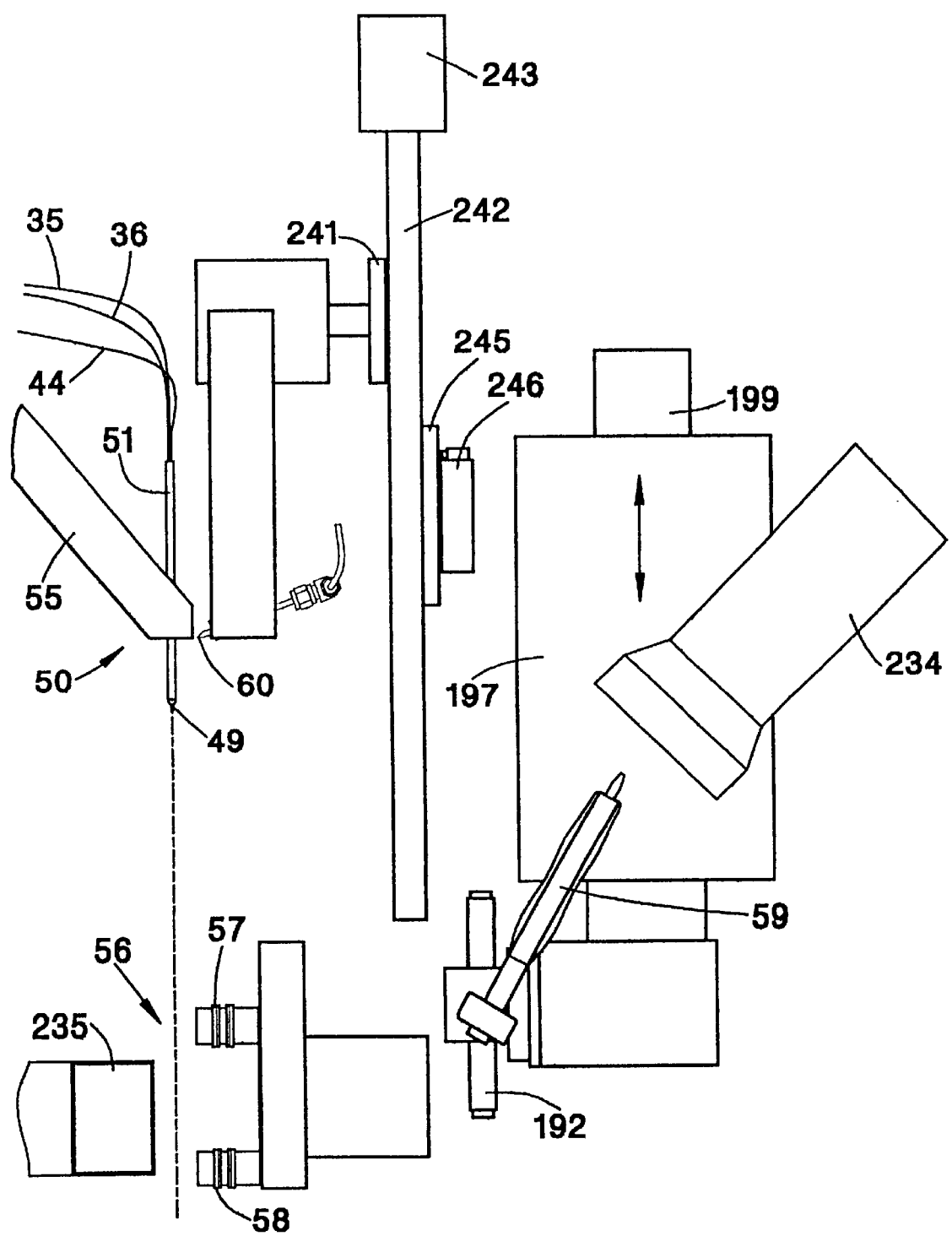
FIGS. 6 and 7 are enlarged views of the upper right portion and the central portion of the automated fiber optic coupler manufacturing apparatus.
Figure 7:
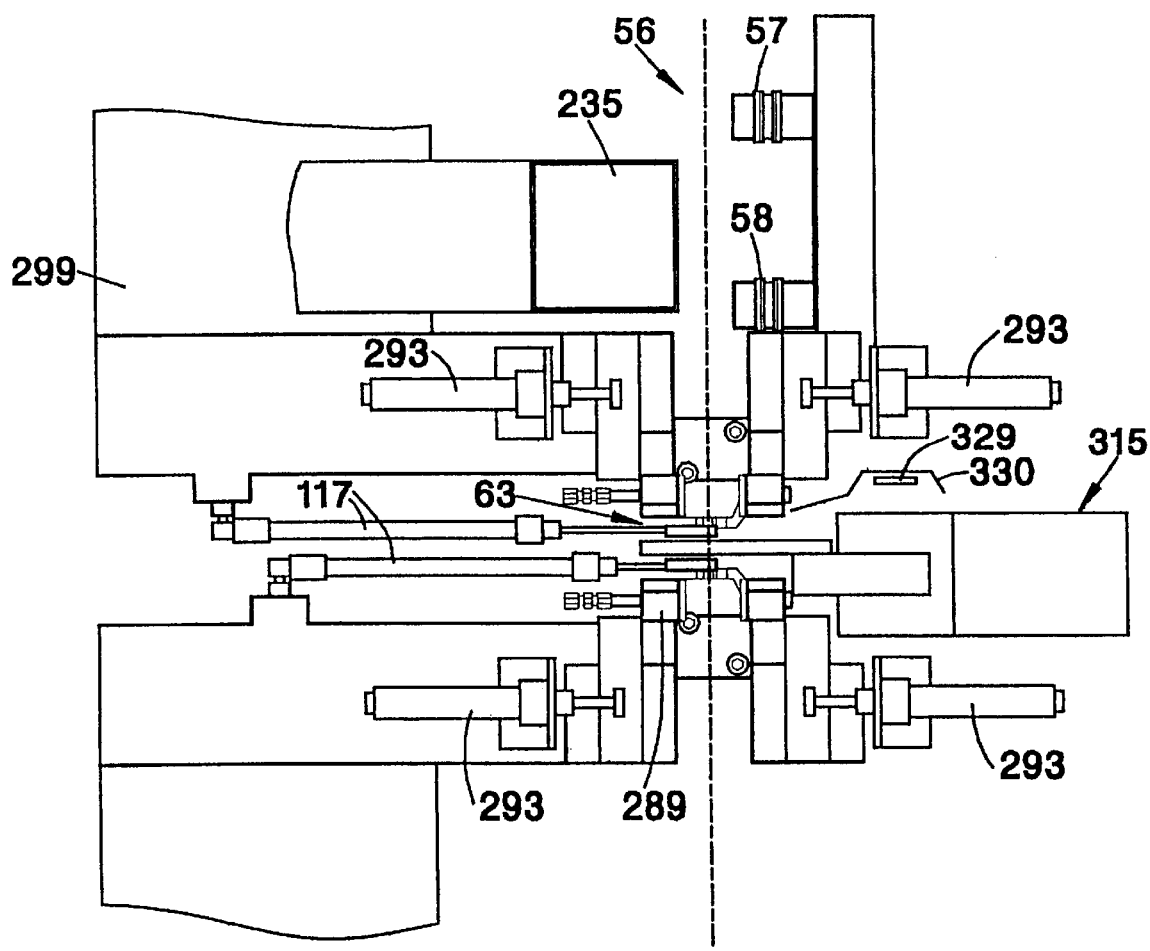

The operation of bottom clamps 69 can be understood by referring to FIG. 5. Clamps 69, which are Sommer ultramatic cam-action grippers Model No. GP-19, are operated by a mechanism 390 which is mounted on an L-shaped. support arm 391. The support arm is affixed-to a linear stage 392 which moves vertically along track 393 when motor 394 is energized. Track 393 is mounted on bottom draw stage 300.

Making a Coupler

Various 1×2 couplers including the 3 dB achromatic coupler disclosed in U.S. Pat. No. 5,011,251 (which is incorporated herein by reference) were made by the process that is generally described below. The flame temperature, length of pull, and characteristics of the capillary tube and optical fibers depend on the specific type of coupler being made. To make the coupler disclosed in U.S. Pat. No. 5,011,251 the two optical fibers had different chlorine concentrations in their claddings. The outside diameters of the optical fiber and the protective coating were 125 $\mu$m and 250 $\mu$m, respectively. Doped silica capillary tubes having a length of 34 mm, an inside diameter of 270 $\mu$m and an outside diameter of 2.8 mm were utilized. Funnels at the ends of the tubes communicated with the bore.

Referring to FIGS. 8, 9 and 10, a glass capillary tube 12 was transferred from magazine 13 to V-groove members 86 where it was located against stop 89 by piston 88. Transfer clamps 92 were traversed in the −z direction until they surrounded tube 12. The clamps were actuated to engage tube 12, and stage 101 moved downwardly, whereby grooves 86 withdrew from tube 12. Clamps 92 were then traversed in the +z direction. Arm 107 rotated to position clamps 92 at coupler draw apparatus 63 where the tube was situated in front of draw chucks 64 and 65. Transfer clamps 92 were traversed in the −z direction, and the end regions of the tube (now designated 12') were placed in the V-grooves of upper and lower chucks 64 and 65, respectively. The tube was secured by clamping bars 113 (FIGS. 11*b* and 12). The transfer clamps were then retracted in the +z direction, and arm 107 was rotated to a vertical position adjacent dispensing mechanism 82.

To deliver fiber 17 to guide tube 36, cyclinder 29 was actuated, thereby engaging roller 27 onto roller 24. Motor 25 turned roller 24 in the clockwise direction of arrow 24*a* (FIG. 2). When a sufficient amount of fiber had been delivered, idler roller 27 retracted from main roller 24, and cyclinder 31 was actuated to lower clamp 30 against bar 32 to prevent further movement of the fiber. During the time that fiber 17 was being delivered, a position holding clamp (not shown) clamped fiber 16 against bar 32 to prevent it's movement. During the delivery of fiber 17 to guide tube 36, cylinder 31 was actuated to retract clamp 30 from bar 32.

Motor 53 (FIG. 2) was energized to vertically position retaining tube 51 such that guide tubes 35 and 36 and dispensing tube 44 were located just above strip clamp 58. Motor 25 was rotated clockwise (arrow 24*a*) and cylinders 29 and 31 were appropriately actuated to cause feed apparatus 23 to deliver about 2–3 cm of coated fiber 17 from the end of guide tube 36. Strip clamp 58 closed on the fiber. Motor 53 was energized to move the guide tube upwardly to a position above strip clamp 57. The fiber was pulled through guide tube 36 as the retaining tube 51 (and thus guide tube 36) moved upwardly. Strip clamp 57 closed on coated fiber 17. Cylinders 172 and 173 (FIG. 17) were actuated to tension the fiber between the strip clamps 57 and 58 for the coating strip operation.

Stripping nozzle 59 was rotated to a horizontal position and was lowered to a y position at which stripping was to start to occur. It was then rotated about rotary mechanism 194 to position the end of nozzle 225 (FIG. 20) adjacent the lower end of the region of coated fiber that was to be stripped. The hot inert gas jet impinged on the coated fiber and then moved upwardly and caused coating to be stripped from a predetermined region of the fiber (about 30 mm long) between the strip clamps. Stripping nozzle 59 rotated in the x-z plane to direct the hot jet-away from the coated fiber and then returned to its resting position.

Ball termination torch 60 was lowered from its resting position position to that level at which fiber 17 was to be severed; it then moved in the −z direction at 38.1 cm/minute. After it moved past the fiber, torch 60 reversed direction and traversed the fiber at 3.81 cm/minute, whereby the fiber became severed. Top clamp 57 moved upwardly about 1–2 mm, and bottom clamp 58 moved downwardly a few centimeters so that tapered end 266 was out of the influence of the flame. As torch 60 continued to move in the. +z direction, a rounded, low reflectance termination was formed on tapered region 211a as described in conjunction with FIGS. 22–25. Strip clamps 57 and 58 were opened, and the small residual piece of fiber was removed from clamp 58. After the end of fiber 17 had been stripped and terminated, fiber 17 was retracted into guide tube 36.

Sometimes optical fiber has a characteristic referred to as "fiber curl" caused by unequal stresses on different sides of the fiber. This could cause the end of fiber 17 which extends from clamp 57 to bend so that it is out of the influence of flame 260 after the fiber has been severed. This can be prevented by keeping the length of fiber extending downwardly from clamp 57 relatively short. To accomplish this, the distance between clamps 57 and 58 should be relatively short, about 4 cm or less being suitable.

Retaining tube 51 was moved to a position such that guide tubes 35 and 36 and dispensing tube 44 were located just above upper strip clamp 57. Stripping nozzle 59 was rotated to horizontal position, lowered and rotated to a position where the hot jet was directed below dispensing tube 44. While the stripping nozzle remained stationary, fiber 16 was fed from the guide tube 35 through the heated gas stream. After coating material was stripped from about 2.5–7.6 cm of the fiber, stripping nozzle 59 rotated away from the fiber, and all but about 1.3 cm of fiber 16 was retracted into guide tube 35. Retaining tube 51 moved downwardly until the end of fiber 16 enterd the capillary tube bore. Fiber 16 was fed through tube 12' until a length appropriate for forming a connection pigtail (about 2 meters, for example) extended from the bottom of the tube. Drops of ethyl alcohol were delivered from dispensing tube 44 while fiber was being fed through tube 12'. The end of fiber 16 that had been end stripped was cleaved, and the cleaved end was put into a cam operated fiber splice assembly tool to temporarily connect it to light source fiber 47 of measurement system 46.

Retaining tube 51 was retracted from tube 12', and fiber 16 was delivered at the same speed so there was no relative movement between fiber and tube. When guide tube 35 was above strip clamp 57, strip clamp 58 closed; strip clamp 57 then closed. The air cylinders 172 and 173 were actuated to tension the fiber between the strip clamp 57 and 58 for the coating strip operation.

A section of coating was stripped from fiber 16 in the same manner as previously discussed in connection with fiber 17. The resultant bare region was slightly shorter than the length of tube 12' (about 30 mm). Strip clamps 57 and 58 then released the fiber.

Through fiber 16 was retracted until the stripped region remained about 0.6 cm from the end of the guide tube 35. The retaining tube and guide tubes were not moving downward toward tube 12' at this time.

Figure 36:
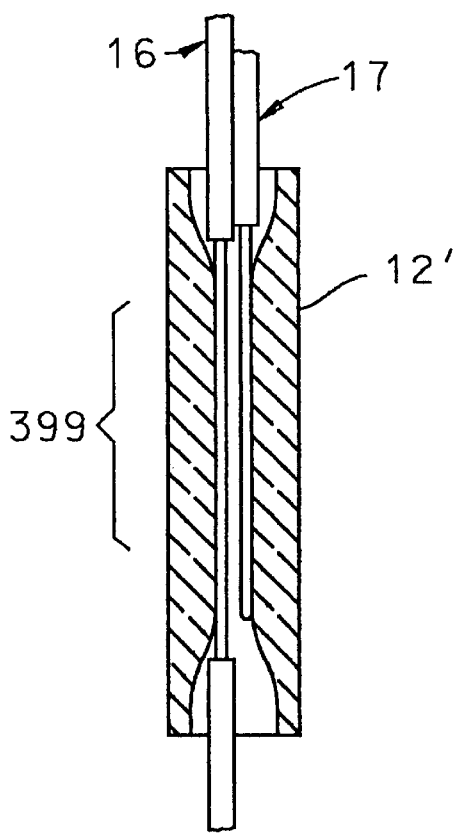
FIG. 36 is a cross-sectional view of tube 12' as it appears in the coupler draw apparatus.

Bottom clamp 69 closed on that portion of fiber 16 extending from the bottom of tube 12'. Motors 53 and 394 were energized, and retaining tube 51 and bottom clamp 69 moved downwardly at the same rate. Drops of alcohol were fed from dispensing tube 44 as the stripped regions of fibers 15 and 16 were simultaneously lowered toward tube 12'. As retaining tube 51 was moved toward tube 12', the stripped end of fiber 17 was fed from guide tube 36 until the end of fiber 17 was positioned at about the center of the stripped region of fiber 16. At this time fiber 17 was no longer fed from guide tube 36, and both fibers were advanced downwardly by movement of retaining tube 51 and lower clamp 69 until the stripped midregion of fiber 16 was centered in the bore of tube 12'. At this time the tip of fiber 17 was located at about the longitudinal center of tube 12'. Fiber 17 was then fed from guide tube 36 until the bare region thereof extended adjacent the stripped midregion of fiber 16 through tube midregion 399 as shown in FIG. 36.

If the bare region of fiber 17 were positioned adjacent the bare region of fiber 16 above tube 12', and both fibers advanced together into the bore of tube 12', the surface tension of the alcohol could cause the bare region of fiber 17 to twist about the bare region of fiber 16. This could affect process reproducibility. The solution to the problem is to deliver the fibers as described above such that the bare region of fiber 16 is positioned in the tube bore first, the tip of fiber 17 being midway down the tube bore and thereafter advancing the bare portion of fiber 17 the remainder of the distance into the bore until both fibers are positioned as shown in FIG. 36.

Bottom vacuum seal 67 was closed, and alcohol was evacuated from the bore of tube 12'. During this step, which lasted about 20–60 seconds (20 seconds being typical), air was pulled through the bore of tube 12'. Air was also bled into left vacuum seal 67 through valve 77.

During the vacuum purge of alcohol from the tube bore, a reference measurement was made by system 46.

Retaining tube 51 was raised and fibers 16 and 17 were fed through tubes 35 and 36 at the same rate until the bottoms of tubes 35, 36 and 44 cleared the top vacuum seals 66.

The top vacuum seals closed, and the bore of tube 12' was evacuated. Air was bled through valve 76 and into one side of the vacuum seal 66 while the other side of vacuum seal 66 was evacauated. This generated a fast moving air stream that removed any alcohol that had accumulated on the top of tube 12'.

The aspirator function, i.e. the bleading of air through valves 76 and 77, occurs at any time that vacuum seals are closed. The aspirator function occurs not only during alcohol removal but also during the evacuation of the tube bore during the later described steps of collapsing the tube onto the fibers and stretching the tube to form a coupler. This is not detrimental to the tube collapse step since only a low level of vacuum is required during that step.

With methane flowing at a rate of 0.5 slpm (full operating level) and oxygen flowing at a rate of 0.1 slpm (a level below operating level), burner sections 310 and 311 were ignited. Cylinder 327 was actuated to move split burner 68 in the −x direction, whereby burner sections 310 and 311 were positioned such that tube 12' was centered within annular regions 316 and 317 (FIGS. 30–32). Burner close mechanism 314 was then actuated to cause sections 310 and 311 to close around tube 12'. At that time the flow of oxygen was increased to full operating level (1 slpm), and the midregion 399 (FIG. 36) of tube 12' was heated to a sufficiently high temperature to cause it to collapse onto the fibers. The vacuum at this time was 27.9 cm of mercury. About 15–30 seconds after the application of the full intensity flame to, tube 12' (typically 22 seconds for the first pull), stage 299 moved upwardly and stage 300 moved downwardly, whereby the top and bottom chucks 64 and 65 were traversed in opposite directions a total of 13 mm. As soon as the stages started to pull the coupler, the programmable controller reduced the flow of oxygen to the burner to zero in 1 second. Since retaining tube 51 and bottom clamps 69 are mounted on upper and lower draw stages 299 and 300, respectively, they also move the same distance as chucks 65 and 66, respectively.

Burner 68 opened and retracted in the +x direction away from tube 12'.

The first pull was intentionally performed such that less than the desired coupling was obtained. An optical measurement was made to determine the amount of coupling that resulted from the first pull. This information was input to the programmable controller, and a second pull was performed.

The burner flame was ignited as described above, and the burner again moved in the −x direction and closed about the tube. About 2–10 seconds after the application of the full intensity flame to the tube (typically about 8 seconds), the top and bottom chucks 64 and 65 were again traversed in opposite directions a total of 2.6 mm. As soon as the stages started to pull the coupler, the programmable controller reduced the flow of oxygen to the burner to zero in 0.75 second. The burner opened and retracted in the +x direction. The burner was shut off.

The combination of the-tube collapse and stretch steps resulted in the formation of a coupler 400 (FIG. 37) having a tapered coupling region 401. The length of the coupler was 49.6 mm.

The vacuum seals were opened.

The epoxy was stored in reservoirs 360 and 361 which were attached to support member 350. Pressure controllers 362 and 363 pressurized reservoirs 360 and 361 at 24 psi and 33 psi, respectively. The epoxy was a mixture of the following components: (a) 33.11 weight percent ELC 2500, an epoxy resin/photoinitiater blend made by Electrolite Corp., Danbury, Conn., (b) 0.34 weight percent additional photoinitiator, (c) 58.23 weight percent magnesium pyrophosphate filler (screened to 35 μm), and (d) 8.32 weight percent 1.5 μm silica microspheres made by Geltech Corp., Alachus, Fla. The viscosity of the epoxy at $25_EC$, $58_EC$ and $82_EC$ is approximately 80 poise, 10–15 poise and 4 poise, respectively.

Figure 37:
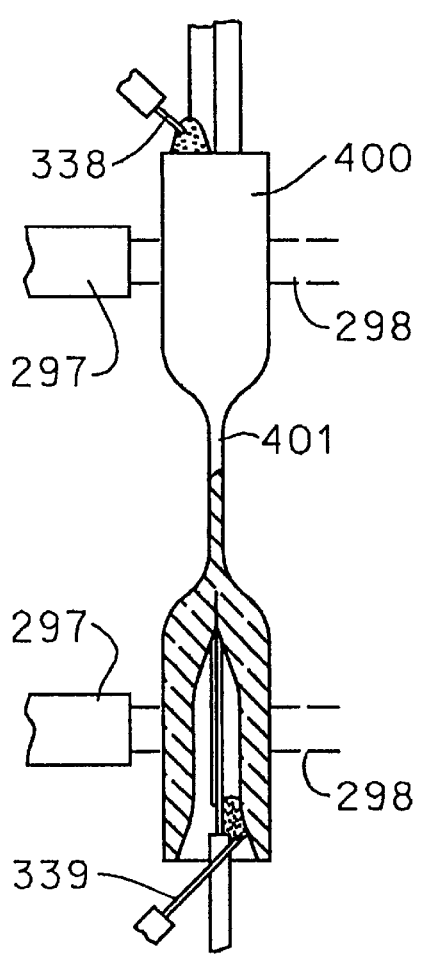
FIG. 37 is a partial cross-sectional view of a coupler during application of epoxy to its ends.

Rotary stage 352 rotated $90_E$ (in the counter-clockwise direction when observed from the top or +y direction) to position devices 340 and 341 farther away from apparatus backplate 200 so that the epoxy application apparatus would clear other equipment as it traverses toward the draw apparatus 63. Stage 355 then moved in the −x-direction, and rotary stage 352 rotated further in the above-described direction. This positioned epoxy application devices adjacent coupler 400 (FIG. 37) with the dispensing needles 338 and 339 vertically removed from the ends of the coupler. Motors 347 and 348 were energized to position the needles adjacent the funnels as illustrated in FIG. 37. The needles can be positioned at (immediately above or into) the funnel during epoxy dispensing.

The angular orientation of top needle 338 did not seem to be critical. The size of needle 338 was 22 gauge. With the end of the needle positioned immediately above the top funnel, actuator 340 was energized 1.75 seconds to deliver a drop of epoxy which, assisted by gravity and capillary action, flowed into the top funnel and into the top bore.

When a needle 339 of similar size was employed to apply epoxy to the bottom funnel, an insufficient amount of epoxy traveled into the bore. Reasons for this are as follows. The ends of the tube reach a maximum temperature of about $95_EC$ during the last stretch step. At the time that the epoxy is applied, the temperature of the top and bottom of the tube has decreased to about $82_EC$ and $58_EC$, respectively. Moreover, the temperature continues to decrease as the epoxy is being applied. This causes the viscosity of the epoxy in the bottom funnel to be higher than that in the top funnel as mentioned above. Also, the epoxy in the bottom funnel must flow upwardly. The following steps were taken to ensure the proper application of epoxy to the bottom funnel and bore. The epoxy applied to the bottom funnel was supplied at a higher pressure, and bottom needle 339 was smaller than needle 338, needle 339 being a size 18 gauge. Needle 339 was oriented at an angle of about $30_E$ from vertical. In general, needle 339 should be oriented less than $45_E$ from vertical. This enables the tip of needle 339 to be positioned deep in the funnel as shown in FIG. 37. In addition, the tip of needle 339 is beveled such that its opening is oriented horizontally or nearly horizontally. This causes the epoxy to be directed up the funnel toward the bore. Since the epoxy is applied to the bottom funnel at higher pressure through a smaller needle, it squirts up into the funnel and reaches the bore where it flows upwardly under the influence of capillary action as well as the force caused by a pressure reduction in the bore due to the cooling of the coupler. The same amount of epoxy is applied to the top and bottom funnels. Because of the small needle size, the flow rate into the bottom funnel was lower; therefore, the actuator 341 was energized 4.2 seconds to deliver a similar drop of epoxy to the bottom funnel.

After a drop of epoxy was injected into each funnel, the needles were retracted vertically from the funnels and were moved away from the longitudinal axis of tube 12'. This caused the epoxy drops to release from the needles. The first application of epoxy was insufficient to completely fill the funnels. If the funnels had been completely filled, an air bubble could have formed and prevented the epoxy from advancing a sufficient distance into the bores. UV light from sources 297 caused the epoxy to cure and cease flowing after it had flowed a predetermined distance into the bores.

After about 3–10 seconds (5 seconds is typical) had elapsed to permit the epoxy to traverse through the funnels and into the tube bores by capillary action, needles 338 and 339 were again positioned at the funnels. A second drop of epoxy was dispensed into each funnel; this drop was sufficient to fill each funnel. The epoxy application apparatus then moved to resting position. The epoxy filled the funnels, which were about 2.5 mm deep and extended into the bores a distance of about 3.5 mm.

In the resting position of arm 377 (FIG. 35) UV light sources 370, 371 are at the same vertical level as upper chuck 64. Motor 378 is activated to rotate arm 377 in the direction of arrow 385. When in its fully rotated position, sources 370 and 371 are located immediately above and below upper clamping bar 113. After the temperature of the coupler is below $40_EC$, UV light sources 370,371 are energized to cure the epoxy in the upper end of tube 12'. The upper clamping bar 113 is optionally open during the time that sources 370, 371 are positioned at the upper end of tube 12'. The period between the time that the coupler has been heated for stretching purposes and the time that the temperature of the coupler has dropped below $40_EC$ can be determined empirically. Arm 377 is rotated to retract light sources 370 and 371 a sufficient distance to clear the equipment. Motor 383 is energized to lower the light sources to a level such that when arm 377 is again rotated in the direction of arrow 385 those sources will be immediately above and below lower clamping bar 113 to cure the epoxy in the lower end of coupler 400. More UV light will reach the epoxy if the lower clamping bar 113 is open at this time.

When the coupler is sufficiently cool (30–45 sec) an optical measurement is made.

The coupler body is released from the draw chucks.

The fiber pigtails at the top of the coupler are metered out by the fiber feed apparatus until about 2 m of fiber extends from the top end of the coupler. The output pigtails are then severed by a cutting tool or by bending fibers 16 and 17 to a tight radius at the ends of guide tubes 35 and 36. Coupler 400 is removed from the draw.

Figure 38:
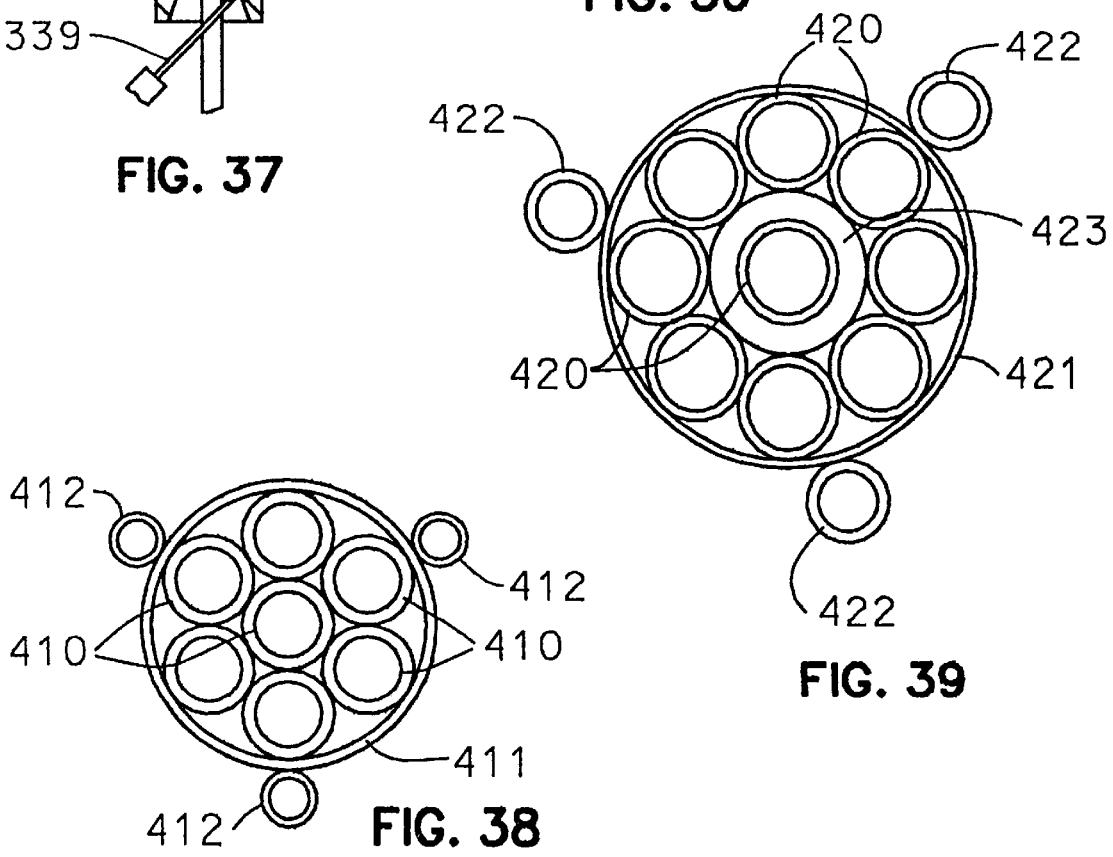

The specific example concerns the formation of 1×2 couplers. The above-described manufacturing apparatus could also be employed to make 1×N couplers of different configurations such as the 1×6 and 1×8, for example. To make a 1×6, guide tubes 410 could be arranged in a six-around-one configuration within a retaining tube 411 (FIG. 38). More than one alcohol dispensing tube could be employed. Also, since it may be desirable to maintain the guide tubes in the illustrated close packed array, the alcohol dispensing tubes can be situated outside the retaining tube. Three dispensing tubes 412 are shown as being equally spaced around the retaining tube.

Figure 39:
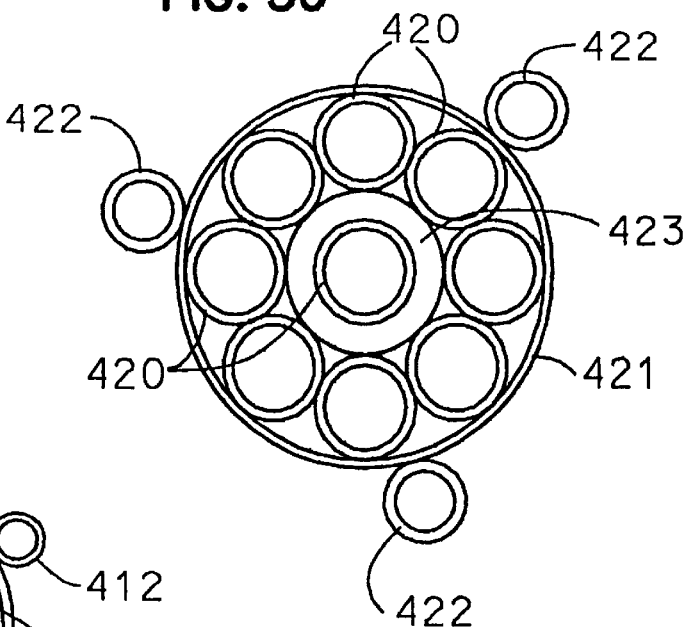
FIGS. 38 and 39 illustrate guide tube arrangements for supplying six-around-one and eight-around-one fiber configurations.

To make a 1×8, guide tubes 420 could be arranged in an eight-around-one configuration within a retaining tube 421, a spacer tube surrounding the central guide tube (FIG. 39). Three dispensing tubes 422 are equally spaced around retaining tube 421.

A semi-automatic coupler manufacturing apparatus could employ some of the components shown in FIGS. 4 and 5. The most important components are the fiber feed and insertion devices. When the disclosed fiber feed device is employed, the disclosed vacuum chucks are extremely useful, since the fibers extending from tube 12' are connected to the measuring system and are extending through the feed tubes. However, the tube 12' could be manually inserted into the chucks. If this were done, the chucks could be of different design. Further, a ring burner could be employed if manual tube insertion were employed. A tube would be inserted through the ring burner and then chucked at its ends. After the coupler is formed, it could be released from the chucks, and the epoxy could be applied and cured off-line.

Figure 40:
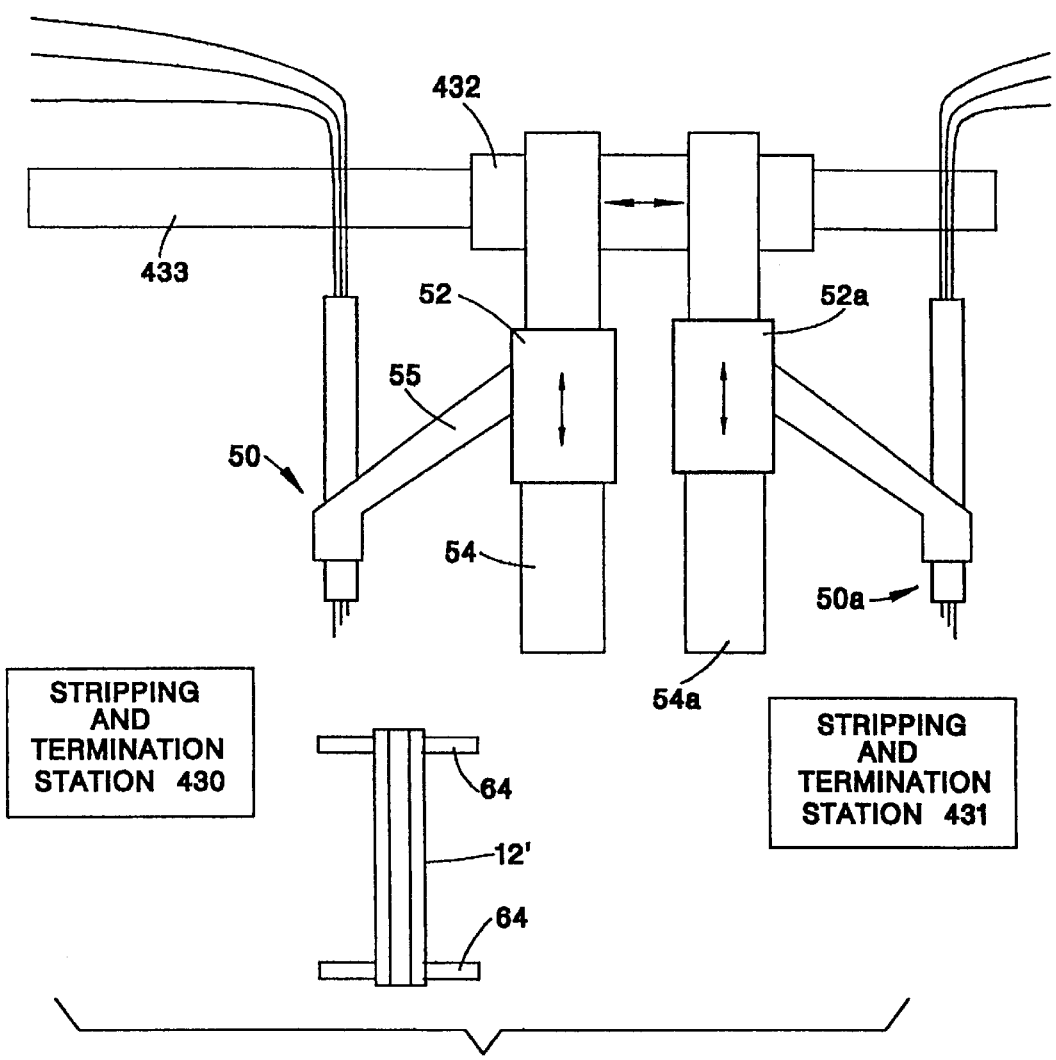
FIG. 40 schematically shows a coupler manufacturing apparatus employing two stripping and terminating stations.

The duplication of certain functions would decrease the time required to make a coupler. FIG. 40 shows how apparatus 10 could be modified by employing two stripping and terminating stations 430 and 431. Each of the stations 430 and 431 is provided with a stripping nozzle, a ball termination torch and a pair of clamps similar to clamps 57 and 58. Tracks 54 and 54a are affixed to a stage 432 that moves horizontally along track 433. In the situation represented by FIG. 40 fiber insertion apparatus 50 had previously been located adjacent stripping and termination station station 430 so that the fibers within the fiber guide tubes of apparatus 50 have been prepared for insertion into tube 12'. Stage 432 has therefore moved to the position shown so that the fibers can be inserted into the tube. Thus, fiber insertion apparatus 50a is located adjacent stripping and termination station station 431 so that the fibers within the fiber guide tubes of apparatus 50a can be prepared for insertion into tube 12'. After the coupler is formed by employing fibers from apparatus 50, stage 432 moves to the left, another tube 12' is inserted into chucks 64, and the fibers from apparatus 50a are inserted into the tube.

Figure 41:
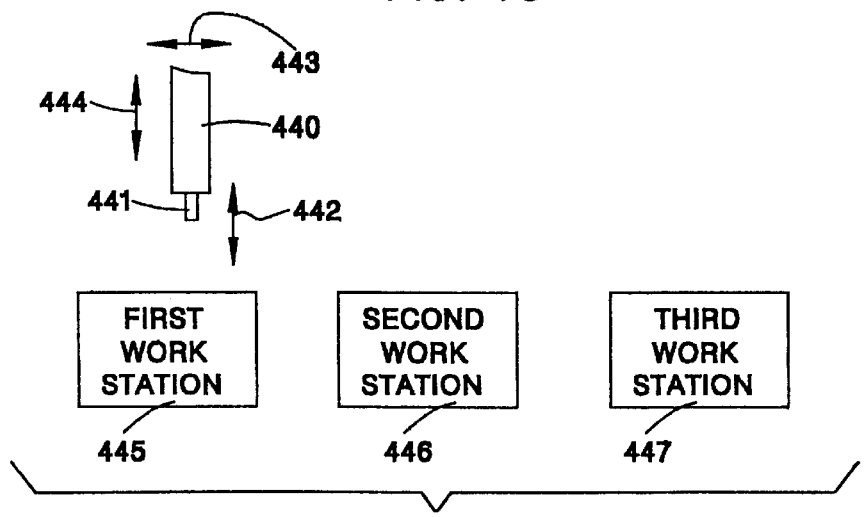
FIG. 41 schematically shows an apparatus for positioning an optical fiber at a plurality of work stations.

The fiber feed apparatus and fiber insertion apparatus shown in FIGS. 2, 15a, 15b and 16 allows one or more fibers to be manipulated remotely while at the same time controlling their absolute position and orientation with respect to a given location and eachother. Such an apparatus could also be employed to position an optical fiber at more than one work station, each of which performs one or more procedures on the fiber. FIG. 41 shows a guide tube 440 in which coated optical fiber 441 is situated. The guide tube can be part of the apparatus shown in FIG. 40 whereby it can be moved vertically or horizontally as indicated by arrows 444 and 443, respectively. In addition, fiber 441 can traverse through tube 440 in either direction as indicated by arrow 442.

The first work station 445 could be one containing a. stripping nozzle for stripping coating material from the end of fiber 441. The fiber could be retracted into tube 440, and that tube could be moved to second work station 446 where the stripped end could be inserted into a grinding machine that forms a lens on the end of the fiber. The lensed fiber could be retracted into tube 440 and moved to third work station 447 where a layer of gold could be deposited thereon by sputtering or the like. The resultant fiber would be suitable for use as a laser diode pigtail. The gold layer enables the fiber to be soldered to a fixture with the lensed end in light receiving relationship with the laser diode.

We claim:

1. An apparatus for applying glue to a fiber optic coupler of the type composed of a plurality of contiguously extending optical fibers, said fibers extending through the bore of a tube and through a longitudinally adjacent coupling region where the tube is collapsed around the fibers, said fibers being fused together in said coupling region, the diameters of said fibers in said coupling region being smaller than the diameters thereof in said bore, said apparatus comprising:
    means for holding said coupler, and
    means for simultaneously injecting glue into both ends of said tube bore;
    wherein said means for injecting comprises:
        first and second hollow needles,
        means for positioning one of said needles at each end of said tube bore, and
        first and second sources of glue respectively connected to said first and second needles;
    wherein said tube is held vertically so that it has upper and lower ends, the inner diameter of said first needle that is insertable into said bottom end being smaller than that of said second needle that is insertable into said top end.

2. The apparatus of claim 1 wherein the tip of said first needle is bevelled such that said first needle is disposed at an angle with respect to the longitudinal axis of said tube. when said first needle is positioned in said bore, and the bevelled end of said first needle lies in a plane that substantially perpendicular to said longitudinal axis.

3. The apparatus of claim 2 wherein said first needle is disposed at an angle less than $45_E$ with respect to said longitudinal axis when said first needle is positioned in said bore.

4. A method for applying glue to a fiber optic coupler composed of a plurality of contiguously extending optical fibers, said fibers extending through the bore of a tube and through a longitudinally adjacent coupling region where the tube is collapsed around the fibers, said fibers being fused together in said coupling region, the diameters of said fibers in said coupling region being smaller than the diameters thereof in said bore, said method comprising:
    holding said coupler, and
    simultaneously injecting glue into both ends of said tube bore;
    wherein said coupler is oriented vertically, said glue being injected into said bore ends by positioning a hollow needle at each of said bore ends, said glue flowing through the needle in the bore at the top end of said tube at a rate greater than it flows through the needle in the bore at the bottom end of said tube.

5. The method of claim 4 wherein said glue is injected into said bore ends by positioning a hollow needle at each of said bore ends, flowing glue through said needles and retracting said needles so that a first drop of glue is inserted into each end of said bore, again positioning said needles at each end of said bore, flowing glue through said needles and retracting said needles so that a second drop of glue is inserted into each end of said bore.

6. The method of claim 5 wherein, during the injection of glue into the ends of said bore, an ultraviolet light beam is directed to each end region of said tube.

* * * * *